United States Patent
Isshiki et al.

(10) Patent No.: US 6,785,745 B2
(45) Date of Patent: Aug. 31, 2004

(54) RECORDING/REPRODUCING DEVICE

(75) Inventors: Atsushi Isshiki, Saijo (JP); Kazuyuki Miura, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 138 days.

(21) Appl. No.: 10/069,071

(22) PCT Filed: Jun. 22, 2001

(86) PCT No.: PCT/JP01/05367
§ 371 (c)(1),
(2), (4) Date: Jun. 17, 2002

(87) PCT Pub. No.: WO01/99107
PCT Pub. Date: Dec. 27, 2001

(65) Prior Publication Data
US 2002/0171965 A1 Nov. 21, 2002

(30) Foreign Application Priority Data
Jun. 22, 2000 (JP) ........................ 2000-188280

(51) Int. Cl.⁷ .............................................. G06F 3/00
(52) U.S. Cl. ............................... 710/5; 710/8; 710/15; 710/22
(58) Field of Search ............................ 710/5, 22, 8, 15

(56) References Cited

U.S. PATENT DOCUMENTS

| | | | |
|---|---|---|---|
| 5,331,613 A | 7/1994 | Yamada | 369/32 |
| 5,774,292 A * | 6/1998 | Georgiou et al. | 360/73.03 |
| 5,982,570 A | 11/1999 | Koizumi et al. | 360/69 |
| 6,151,182 A | 11/2000 | Koizumi et al. | 360/69 |
| 6,209,023 B1 * | 3/2001 | Dimitroff et al. | 709/211 |
| 6,330,653 B1 * | 12/2001 | Murray et al. | 711/173 |

FOREIGN PATENT DOCUMENTS

| | | |
|---|---|---|
| CN | 001113590 | 12/1995 |
| EP | 000686971 | 12/1995 |
| JP | 3-040271 | 2/1991 |
| JP | 5-210468 | 8/1993 |
| JP | 7-334950 | 12/1995 |
| JP | 9-258907 | 10/1997 |
| SG | 000032364 | 8/1996 |

* cited by examiner

Primary Examiner—Jeffrey Gaffin
Assistant Examiner—Alan Chen
(74) Attorney, Agent, or Firm—Wenderoth, Lind & Ponack, L.L.P.

(57) ABSTRACT

A recording/playback apparatus includes an upper control unit which transmits a composite command, which includes a real processing command and a virtual command, to a disk device. The disk device performs a process until a point of time when an operation cannot be continued unless the virtual command is changed to the real processing command to be operated beforehand. Instead of standing by after the real processing command is completed, the disk device can voluntarily operate beforehand in response to the virtual command, while selecting an optimum seek speed or disk rotation speed. The recording/playback apparatus can thus maintain the continuity of continuous data and perform an optimum operation in accordance with an expected performance while switching speeds of seek and disk rotation in detail.

30 Claims, 15 Drawing Sheets

RECORDING/REPRODUCING DEVICE

BACKGROUND OF THE INVENTION

1. Field of the Invention

The present invention relates to a recording/playback apparatus for writing or reading continuous data in/from a magnetic disk device which is included in electronic equipment for handling continuous data such as audio and video data, and more particularly, to a recording/playback apparatus which satisfies a device performance that is desired by the operator without interrupting continuous data.

2. Description of the Related Art

A conventional recording/playback apparatus has been provided for recording or reproducing continuous data which have been obtained by digitizing analog data of video or the like by the apparatus itself or which have originally been digital data. The conventional recording/playback apparatus has a recording device using a disk type recording medium, which is a so-called hard disk drive, as a recording/playback means, and an upper control unit for controlling the continuous data and also for integrally controlling data input/output or the like. FIG. 14 is a block diagram illustrating the construction of the main parts of the conventional recording/playback apparatus.

In FIG. 14, numeral 1 denotes a disk type recording medium, and numeral 3 denotes a motor for rotating the disk type recording medium 1. Further, numeral 2 denotes a recording/playback head for writing digital data that are transmitted from a lower control unit 5 in the disk type recording medium 1, or for reading the digital data that are written in the disk type recording medium 1 and transmitting the data to the lower control unit 5. Further, numeral 4 denotes an actuator which enables a seek operation for moving the recording/playback head 2 on the disk type recording medium 1 in the direction of the radius of the medium 1, and numeral 6 denotes a memory for temporarily holding the data when the data are written in or read from the disk type recording medium 1 or when an error correction process or the like is carried out. Numeral 7 denotes an interface unit for exchanging data and commands with an upper control unit 9. Numeral 5 denotes a lower control unit for controlling the interface unit 7, the memory 6, the actuator 4, the motor 3, and the recording/playback head 2. An apparatus comprising the above-described constituents 1 to 7 is considered as a single device which is known as a hard disk drive, and such a hard disk drive is regarded as a disk device 13.

Further, numeral 12 denotes an input unit for receiving an input of data such as video data, and numeral 11 denotes an output unit for outputting the data to a video display unit such as a monitor. Numeral 8 denotes an interface unit for exchanging data and commands with the disk device 13. The interface unit 8 transmits a command or data to be written to the disk device 13 by a command 14, and the interface unit 8 receives a response or read data from the disk device 13 by a response 15 to the command 14. Numeral 10 denotes a memory for temporarily holding the continuous data such as video data which are supplied from the input unit 12, for temporarily holding the data before being outputted to the output unit 11, or for temporarily holding the data for processing the data, performing an error correction process or the like on the data. Numeral 9 denotes an upper control unit for integrally controlling the processes such as data reading, writing and the like through the input unit 12, the output unit 11, the memory 10 the interface unit 8, and the disk device 13.

The disk device 13 is considered to be a sort of hard disk drive as a recording unit of a computer. In the conventional recording/playback apparatus, a command to be transmitted by the command 14 is a single command, and the response 15 to the command 14 is also a single response.

Next, the operation of the conventional recording/playback apparatus will be described according to a flowchart shown in FIG. 15. FIG. 15 is a flowchart illustrating the operation of the conventional recording/playback apparatus.

Initially, in step S101, the upper control unit 9 sends a single command 14 to the disk device 13.

For example, it is assumed that the command 14 is a command for reading a predetermined quantity of data from an address A on the disk type recording medium 1.

The disk device 13, which has received the command 14 in step S102, controls the actuator 4 by the lower control means 5 in step S103, and moves the recording/playback head 2 to the address A on the disk type recording medium 1. Then, in step S104, it is determined whether a servo is operated or not. When no servo is operated, the disk device 13 returns to an operation for operating the servo. When the servo is operated, the disk device proceeds to step S105. In step S105, the disk device 13 executes reading of data from the disk type recording medium 1, and confirms the reading operation in step S106. When the reading operation is "OK", the disk device 13 proceeds to step S108; otherwise, the disk device proceeds to step S107. In step S107, it is determined whether the reading operation exceeds a limited number of times that is previously set. When the reading operation is under the limited number of times, the disk device 13 returns to step S104 to perform the reading operation again. When the reading operation reaches the limited number of times, the disk device 13 proceeds to step S110.

In step S108, the lower control unit 5 sends the data which is read in step S105 to the upper control unit 9 through the interface units 7 and 8, and the upper control unit 9 receives the data. When the data transmission to the upper control unit 9 is completed, the disk device 13 proceeds to step S110, and sends a response 15 to the upper control unit 9 as to whether the process indicated by the command 14 is completed or not.

When the disk device 13, which is provided with the disk type recording medium 1 and which operates as described above, is used as a recording unit of a computer, the disk rotation speed and the seek speed for moving the recording/playback head 2 are usually set at high speeds for the speed-up of data processing. However, such speed-up causes a drawback in that noise is high and power consumption is also high as a device. As a method for solving this drawback, Japanese Published Patent Application No. Hei. 7-334950 discloses a disk device in which the user can select a mode for reducing the disk rotation speed or the seek speed at the sacrifice of the data processing speed.

In the device disclosed in Japanese Published Patent Application No. Hei. 7-334950, however, when a high rotation speed is selected, stillness and power consumption are sacrificed although high-speed data processing can be achieved. On the other hand, when a low rotation speed is selected, high-speed data processing cannot be achieved although stillness and power consumption are satisfactory.

The reason the above-described operations is as follows. The conventional disk device 13 has been known as a recording unit of a computer and is only required to perform reliable recording and playback of data even when the data are discontinuous on the time axis. Therefore, the stated requirement is satisfied as long as the user can selectively specify a performance on which the user places a great importance as described above.

When the recording/playback apparatus that is provided with the disk device 13 handles video or audio data, it is required, however, that the upper control unit 9 performs processes such as writing/reading of continuous-data on the time axis such as video and audio data in/from the disk device 13, video display on a video display unit connected to the upper control unit 9 and the like in the state where the data are continuous on the time axis. In order to perform such processes in which continuity should be maintained, by the disk device 13 performing time-division processing, the disk device 13 should store the continuous data in the memory 10 that is connected to the upper control unit 9, and perform the processes while maintaining the continuity.

Accordingly, as for the video processing in the disk device 13, there might be a case where a high processing speed is required for recording the data that are externally supplied on the disk type recording medium 1 and, simultaneously, for outputting the already-recorded data from the output unit 11 so as to reproduce the data on a monitor or the like. Further, there might also be a case where a high processing speed is not required because the data that ate recorded on the disk type recording medium 1 in the disk device 13 are only outputted from the output unit 11 so as to reproduce the data on the monitor or the like. Therefore, in the above-mentioned method wherein the user uniquely selects the processing speed, which is disclosed in Japanese Published Patent Application No. Hei. 7-334950, since the processing speed must be adjusted to the maximum speed among the processing contents so that the continuity of the continuous data is not degraded, stillness and power consumption are sacrificed in many cases.

Furthermore, since the conventional recording/playback apparatus is used as a recording unit of a computer, the upper control unit 9, in the processing mode, issues a single command, and the disk device 13 merely responds to the single command from the upper control unit 9.

This is advantageous for the upper control unit 9 which controls the whole recording/playback apparatus because the upper control unit 9 controls the disk device 13 only when required to do so and thus does not need to check the response when not required to do so, and as a result, the upper control unit 9 can efficiently control the whole apparatus. However, in the disk device 13, there arises a problem in that an appropriate operation to the processing cannot be carried out.

The present invention is made to solve the above-described problems. An object of the present invention is to provide a recording/playback apparatus for processing continuous data such as audio and video data, where the apparatus operates so as to realize device performances, such as low power consumption and stillness, that are desired by the operator without interrupting the continuous data.

SUMMARY OF THE INVENTION

According to a first aspect of the-present invention, a recording/playback apparatus comprises a disk device for recording data on a disk type recording medium; and an upper control unit for controlling processes such as input/output of data from/to the outside of the apparatus, reproduction and processing of data, as well as data processing such as reading and writing of the disk device. The upper control unit includes a composite command issuance unit which issues, to the disk device, a composite command comprising a real processing command, which is a processing command to be actually executed in the disk device, and a virtual command, which is a processing command that is expected to be issued by the upper control unit to the disk device after the disk device has processed the real processing command. The disk device comprises a lower control means for receiving the composite command from the upper control unit, and for controlling writing or reading of digital data, and a recording/playback head for performing writing or reading of digital data in/from the disk type recording medium.

Thereby, after the disk device has completed the process corresponding to the real processing command, the disk device does not go into the standby state where the disk device waits for a next command. Instead, the disk device voluntarily operates in response to the virtual command.

According to a second aspect of the present invention, in accordance with the recording/playback apparatus of the first aspect, the lower control means includes a virtual command reception means for receiving the virtual command of the composite command, and for making the disk device execute a process corresponding to the virtual command and then making the disk device standby. The process corresponding to the virtual command is a process up to a point of time when the disk device cannot continue the operation unless the virtual command is changed to the real processing command. The lower control means receives the composite command, makes the disk device carry out a process corresponding to the real processing command, makes a response to notify the upper control unit that the process corresponding to the real processing command is completed, and thereafter, the virtual command reception means performs the process corresponding to the virtual command.

Thereby, the time from when a command is issued from the upper control unit to when the process is completed can be shortened, and a risk of interrupting continuous data such as video data can be reduced.

According to a third aspect of the present invention, in accordance with the recording/playback apparatus of the first aspect, the upper control unit further comprises a judgment criteria issuance means. The judgment criteria issuance means itself creates judgment criteria which is suitable for a performance that is desired by an operator of the recording/playback apparatus, which performance is uniquely set or is selected from a plurality of prepared performances by the operator, and issues the same to the disk device. The disk device further comprises a speed switching means for switching at least either of at least two or more seek speeds which are speeds for transferring the recording/playback head, and at least two or more disk rotation speeds which are speeds for rotating the disk type recording medium. The disk device also comprises a speed selection means for selecting an optimum seek speed or disk rotation speed from the judgment criteria. The disk device receives the judgment criteria which is suitable for the performance that is desired by the operator from the judgment criteria issuance means, selects the optimum seek speed and disk rotation speed by the speed selection means, and switches the seek speed and disk rotation speed to the selected optimum speeds by the speed switching means.

Thereby, after the disk device has completed the process corresponding to the real processing command, the disk device can voluntarily operate beforehand in response to the virtual command and, furthermore, it can operate in response to both of the real processing command and the virtual command in accordance with the judgment criteria corresponding to the device performance that is desired by the operator, while switching the seek speed or the disk rotation speed, thereby performing an optimum operation in more detail.

According to a fourth aspect of the present invention, in accordance with the recording/playback apparatus of the third aspect, the judgment criteria, in accordance with the performance that is desired by the operator of the recording/playback apparatus are based on the assumption that the continuity of continuous data is maintained, include a predetermined time which restricts the frequency of switching of the disk rotation speed, and give priority to a highly expected speed in the seek speeds or disk rotation speeds.

Thereby, the upper control unit can create the judgment criteria corresponding to the device performance that is desired by the operator, and can transmit the same to the disk device.

According to a fifth aspect of the present invention, in accordance with the recording/playback apparatus of the third aspect, the upper control unit further comprises an expected time information issuance means for issuing an expected time together with the composite command to the disk device. The expected time is a time which is obtained by expecting a lapsed time from when the upper control unit issues the composite command by the composite command issuance means to when the virtual command of the composite command is issued as the real processing command.

Thereby, the disk device can operate without interrupting continuous data while switching the operation speed within the expected time, in execution of the virtual processing command and the virtual command.

According to a sixth aspect of the present invention, in accordance with the recording/playback apparatus of the third aspect, the upper control unit further comprises an expected time information issuance means for issuing an expected time and an expected command issuance interval together with the composite command to the disk device. The expected time is a time which is obtained by expecting a lapsed time from when the upper control unit issues the composite command by the composite command issuance means to when the virtual command of the composite command is issued as the real processing command. The expected command issuance interval is an interval which is obtained by expecting a command issuance interval at which a plurality of commands are issued after the composite command is issued. When the expected command issuance interval is one in which, during a set time which is set sufficiently longer than the predetermined time that is included in the judgment criteria, first expected command intervals that are approximately equal intervals are continued, and thereafter, second expected intervals that are approximately equal intervals, which are different from the first expected command intervals, are continued, the expected time information issuance means issues the first expected interval, the second expected command interval, and an expected change time at which the command interval is expected to change from the first expected command interval to the second expected command interval, together with, the composite command and the expected time, to the disk device. When the expected command issuance interval is one in which the first expected command intervals are continued during the set time, the expected time information issuance means issues the first expected command interval, the second expected command interval having the same value as the first expected command interval, and the expected change time having the same value as the set time, together with the composite command and the expected time, to the disk device.

Thereby, the disk device can perform switching of the disk rotation speed, which will take a relatively long time, as well as the seek speed, by using a long-term expectation.

According to a seventh aspect of the present invention, in accordance with the recording/playback apparatus of the sixth aspect, the disk device performs a process corresponding to the real processing command and a process corresponding to the virtual command while switching at least either of the seek speed and the disk rotation speed on the basis of the judgment criteria, processing speed information of the disk device itself, the expected time, the first expected command interval, the second expected command interval, and the expected change time.

Thereby, the disk device can perform an optimum operation for the device performance desired by the operator.

According to an eighth aspect of the present invention, in accordance with the recording/playback apparatus of the seventh aspect, the upper control unit calculates the expected time, or the first expected command interval, the second expected command interval, and the expected change time, on the basis of a processing content of continuous data controlled by the upper control unit itself, a speed at which the continuous data are processed in a memory that is connected to the upper control unit and temporarily stores the continuous data, and processing speed information of the disk device.

Thereby, continuous data to be processed, such as video data, can be processed without interrupting the data.

According to a ninth aspect of the present invention, in accordance with the recording/playback apparatus of the second aspect, the virtual command reception means performs the process corresponding to the virtual command while switching the seek speed or the disk rotation speed. The disk device issues a response to the upper control unit at the point of time when each process is completed in the process corresponding to the virtual command. Further, the upper control unit is provided with a response-to-virtual-command obtaining means for obtaining the response.

Thereby, the upper control unit can grasp the present state of the disk device, and issue a more appropriate processing command.

According to a tenth aspect of the present invention, in accordance with the recording/playback apparatus of the ninth aspect, in the process corresponding to the virtual command, when the virtual command includes reading of address and data, the disk device performs reading after seeking to the address, stores the data in the memory installed in the disk device and, thereafter, issues a response to the upper control unit, and goes into a standby state.

Thereby, when the virtual command indicating reading changes to the real processing command, the reading operation can be completed earlier, whereby data can be processed without impairing the continuity of data.

According to an eleventh aspect of the present invention, in accordance with the recording/playback apparatus of the ninth aspect, in the process corresponding to the virtual command, when the virtual command includes writing of address and data, the disk device issues a response to the upper control unit after seeking to the address, requires data to be written, stores the data to be written, which are transmitted from the upper control unit in response to the requirement, in the memory installed in the disk device, and goes into a standby state.

Thereby, when the virtual command indicates writing changes to the real processing command, the writing operation can be completed earlier, whereby data can be processed without impairing the continuity of data.

According to a twelfth aspect of the present invention, in accordance with the recording/playback apparatus of any one of the tenth or eleventh aspects, in the process corresponding to the virtual command, when data to be written are stored in the memory installed in the disk device, an approximately whole capacity of the memory is used leaving a capacity required for a minimum process such as error correction, and, when data to be written are stored, the data to be written are stored upon maintaining a minimum quantity which can be read at high speed by the disk device, in the memory, as a free capacity.

Thereby, when the virtual command is not changed to the real processing command as expected, an advance process corresponding to the virtual command can be executed without losing data for writing, which data are required for recording.

According to a thirteenth aspect of the present invention, in accordance with the recording/playback apparatus of the third aspect, the disk device stores an operation speed of the disk device itself, an operation switching speed, information concerning power consumption, and the like in the disk type recording medium or in an nonvolatile memory which is installed in the disk device, in a predetermined format; and the upper control unit obtains the information as required at start-up or the like of the recording/playback apparatus, and creates the appropriate judgment criteria, thereby controlling the disk device.

Thereby, even when the disk device is exchanged due to failure or the like, the upper control unit can obtain information required when creating the judgment criteria, and can update the judgment criteria.

DETAILED DESCRIPTION OF THE INVENTION

First Embodiment

Figure 1:
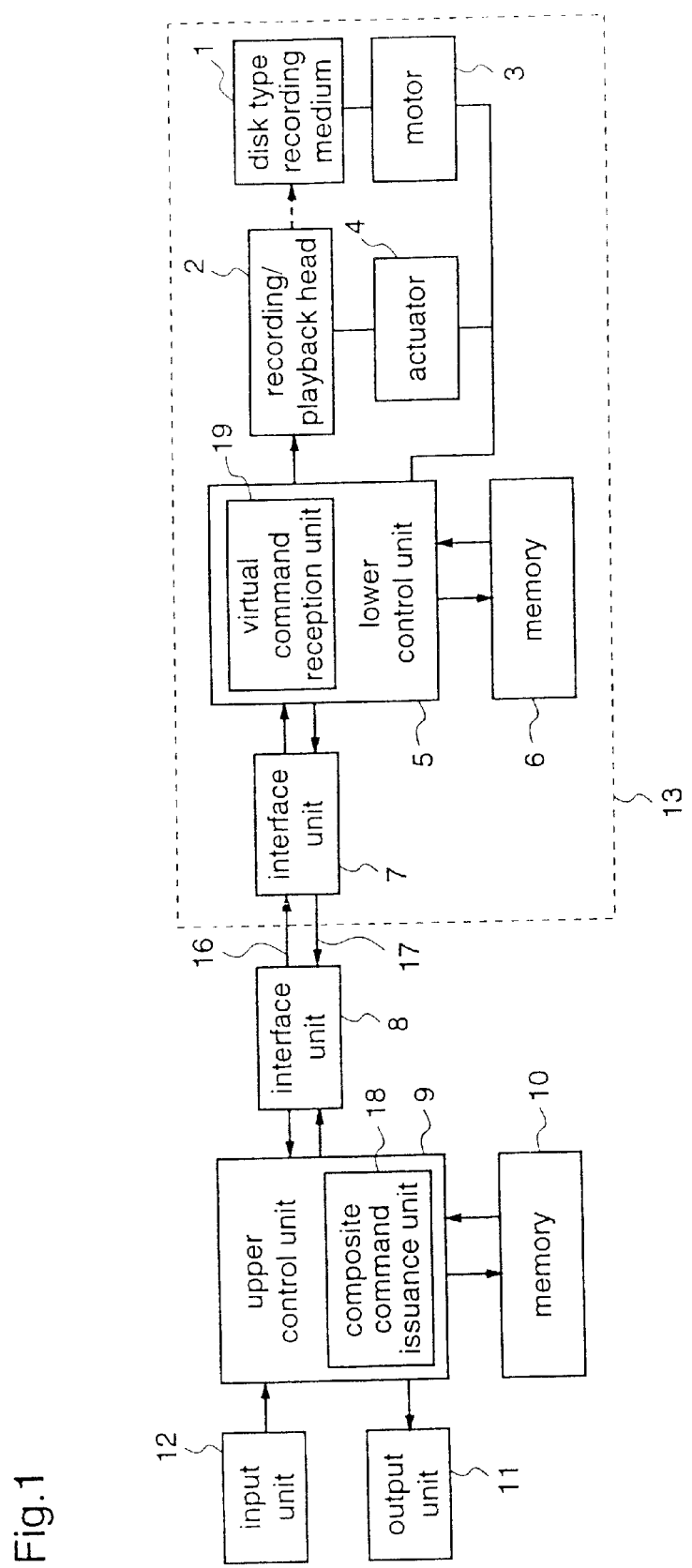
FIG. 1 is a block diagram of a recording/playback apparatus according to a first embodiment of the present invention.

Hereinafter, a first embodiment of the present invention will be described.

In a recording/playback apparatus according to the first embodiment, a command 16 which is issued by an upper control unit 9 through interface units 7 and 8 to a lower control unit 5 is not a single command as in the prior art. Instead, the command 16 is a composite command comprising a real processing command for actually performing processing, which corresponds to the conventional single command, and a virtual command which is supposed to be issued to a disk device 13 after the real processing command.

Figure 14:
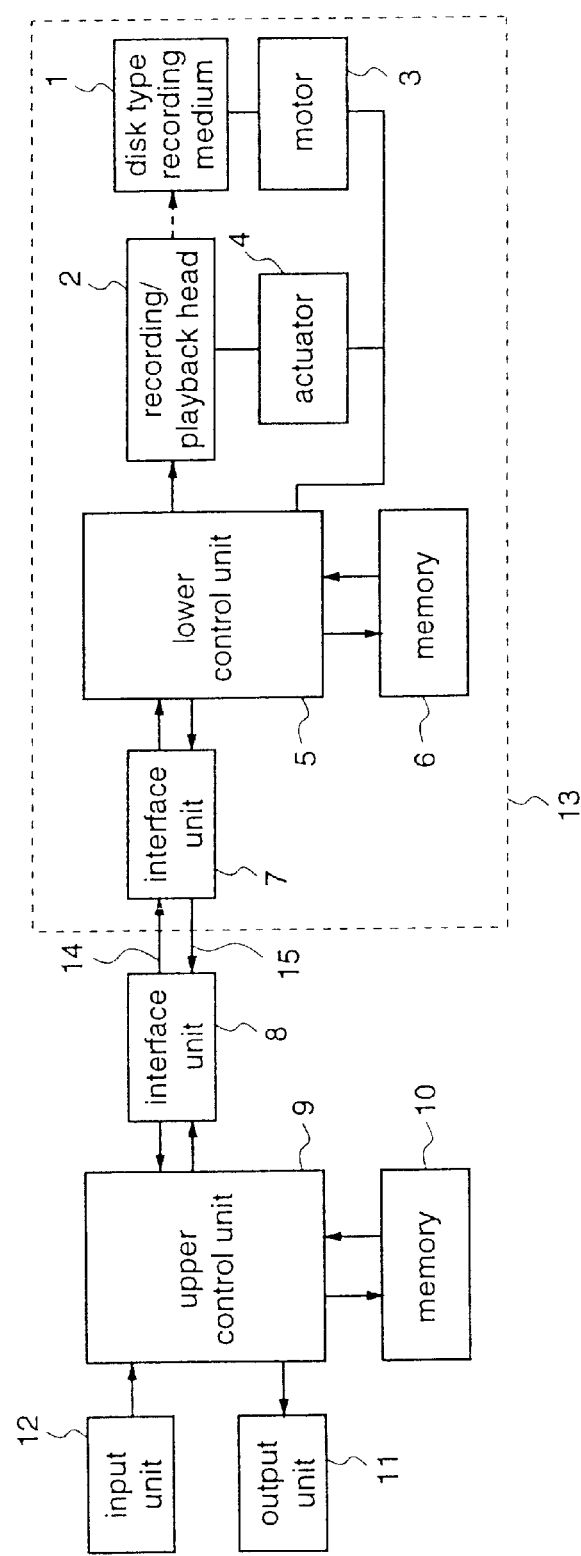
FIG. 14 is a block diagram of a conventional recording/playback apparatus.
Figure 15:
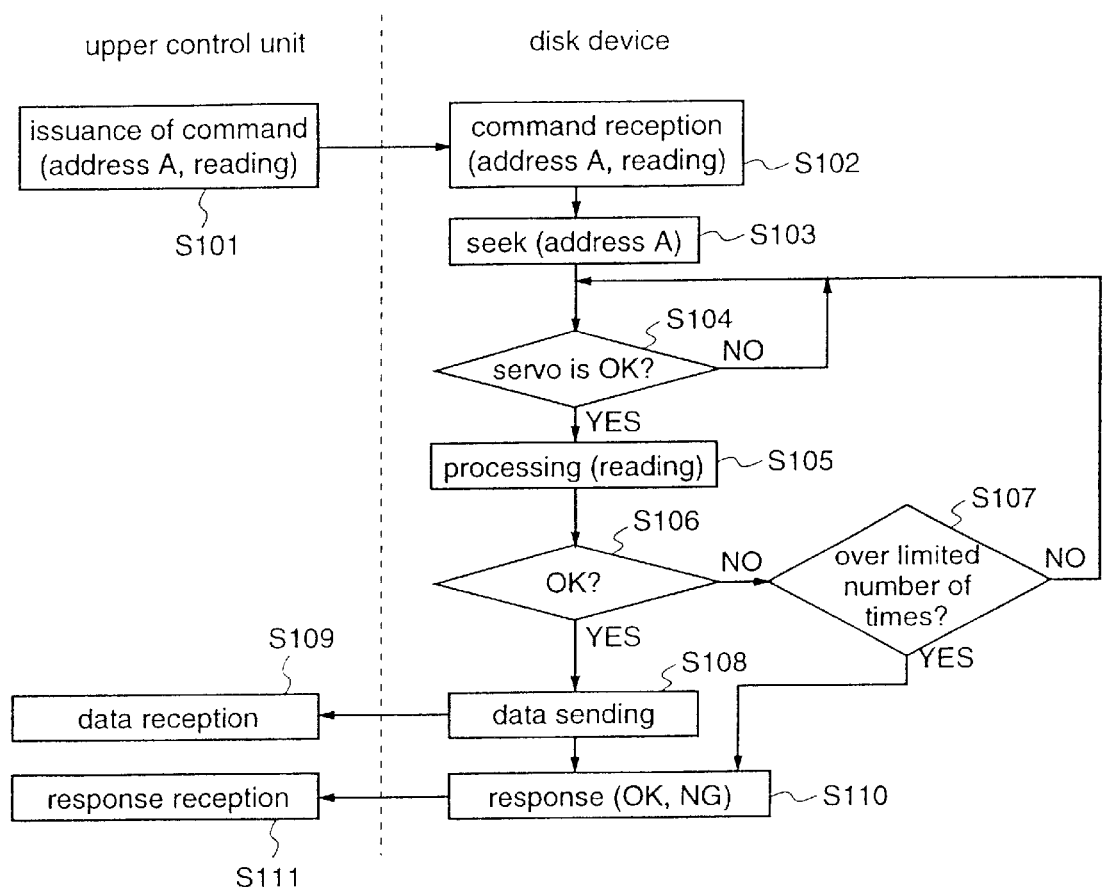
FIG. 15 is a flowchart illustrating an operation of the conventional recording/playback apparatus.

Initially, the construction of the recording/playback apparatus according to the first embodiment will be described with reference to FIG. 1. FIG. 1 is a block diagram of the recording/playback apparatus according to the first embodiment. In FIG. 1, the same constituents as those of the prior art shown in FIG. 14 are given the same reference numerals, and a description thereof will be omitted.

In FIG. 1, numeral 18 denotes a composite command issuance unit for issuing the composite command 16 comprising the real processing command and the virtual command to the disk device 13. Numeral 19 denotes a virtual command reception unit for receiving the virtual command from the upper control unit 9, for making the disk device 13 execute a process corresponding to the virtual command as far as the process can be performed without changing the virtual command to the real command, and thereafter, for making the disk device 13 standby in a standby state. Numeral 17 denotes a response to the composite-command 16 (real processing command and virtual command).

Figure 2:
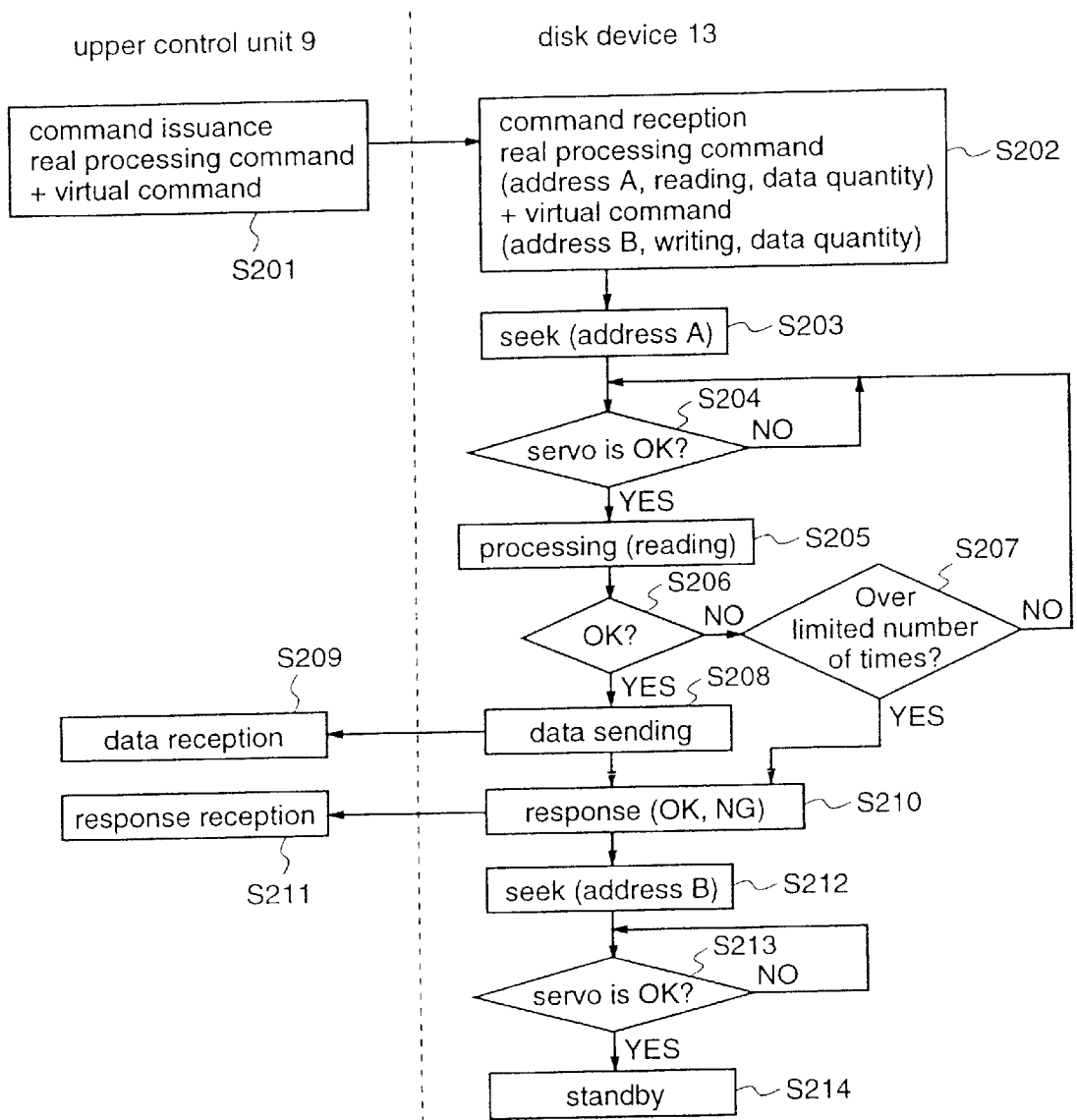
FIG. 2 is a flowchart illustrating an operation of the recording/playback apparatus according to the first embodiment of the present invention.

Next, the operation of the recording/playback apparatus according to the first embodiment will be described according to a flowchart shown in FIG. 2. FIG. 2 is a flowchart illustrating the operation of the recording/playback apparatus according to the first embodiment.

Initially, in step S201, the composite command issuance unit 18 of the upper control unit 9 sends the composite command 16 comprising the real processing command and the virtual command to the disk device 13.

For example, it is assumed that the real processing command is a command for reading a predetermined quantity of data from an address A on the disk type recording medium 1 It is also assumed, for example, that the virtual command is a command for reading a predetermined quantity of data from a memory 10, and for writing the data into an address B, which is different from the address A, on the disk type recording medium 1.

Thereafter, in step S202, the composite command 16 as mentioned above is transmitted through the interface units 7 and 8 and is received by the lower control unit 5 in the disk device 13. Further, in step S202, the virtual command in the composite command 16 is received by the virtual command reception unit 19:.

Then, in steps S203 to 210, the disk device 13 executes the real processing command in the composite command 16.

To be specific, initially, the lower control unit 5 of the disk device 13 controls the actuator 4 so that the recording/playback head 2 seeks and moves to the address A on the disk type recording medium 1 in step S203, and the lower control unit 5 checks (determines) whether a servo is operated or not. When no servo is operated, the lower control unit 5 returns to the operation for operating the servo; otherwise, the lower control unit 5 goes to step S205. In step S205, a predetermined quantity of data are read from the address A on the disk type recording medium 1, and in step S206, the reading operation is checked. When the reading operation is "OK", the lower control unit 5 goes to step S208; otherwise, the lower control unit 5 goes to step S207.

When it is decided in step S206 that the reading operation is not "OK" and the lower control unit 5 goes to step S207, it is checked (determined) whether the number of execution times of the reading operation exceeds a limited number of times which is set previously. When the number of execution times of the reading operation is under the limited number of times, the lower control unit 5 returns to step S204 so as to perform the reading operation again and, when reaching the limited number of times, the lower control unit 5, in step S210, notifies the upper control unit 9 that the processing is not completed.

Further, when the reading operation is judged as being "OK" in step S206 and the lower control unit 5 goes to step S208, the lower control unit 5 sends the data which are read in step S205, through the interface units 7 and 8, to the upper control unit 9, and the upper control unit 9 successively receives the data in step S209. When the disk device 13 completes the data transmission, the lower control unit 5 makes a response 17 to notify the upper control unit 9 that the processing is completed in step S210, and the upper control unit 9 receives this response 17 in step S211.

The processes up to this point corresponding to the real processing command are identical to the operation in the case where a single command is sent to the disk device 13 in the prior art. In the first embodiment, processes corresponding to the virtual command, which is included in the composite command 16 that is received by the lower control unit 5 in the disk device 13 in step S202 and which is inputted to the virtual command reception unit 19, will be carried out in the following steps S212 to S214.

To be specific, in step S212, the virtual command reception unit 19 in the disk device 13 controls the actuator 4 so that the recording/playback head 2 seeks and moves to the address B on the disk type recording medium 1, and the virtual command reception unit 19 checks (determines) whether the servo is operated or not in step 213. When no servo is operated, the servo is operated again; otherwise, it goes to step S214 and stands by in a standby state.

Although it is not shown in FIG. 2, when the above-mentioned virtual command changes to the actual command, i.e., the real processing command, the disk device 13 receives the data that are recorded on the memory 10 through the interface units 7 and 8, and writes the data in the address B onto which the recording/playback head 2 has previously been moved in step S212.

As described above, according to the first embodiment, the command to be transmitted through the interfaces 7 and 8 to the lower control unit 5 by the upper control unit 9 is changed from a single command to the composite command 16 comprising the real processing command and the virtual command, and the processing that is indicated by the virtual command is performed after the processing that is indicated by the real processing command. Therefore, in the first embodiment, when the virtual command changes to the real processing command, the processing corresponding to the command can be performed with the above-described processing time being omitted, whereas in the prior art, the recording/playback head 2 is sought and moved from the point of time when a new command is issued and, further, a time to perform a servo check is required. Accordingly, in the recording/playback apparatus of the first embodiment, the time for executing the processing to the command from the upper control unit 9 can be reduced. This reduction in the processing time is advantageous in maintaining the continuity of the continuous data such as video data to be handled, and results in that the recording/playback apparatus can safely continue the processing.

Second Embodiment

Hereinafter, a second embodiment of the present invention will be described.

In a recording/playback apparatus according to the second embodiment, a selectable seek speed or disk rotation speed is not uniquely selected for the device performance that is desired by the operator of the recording/playback apparatus. In addition, in the recording/playback apparatus of the second embodiment the upper control unit 9 determines a judgment criteria for the device performance that is desired by the operator on the precondition that the continuity of continuous data such as video data is ensured in the recording/playback apparatus, and the disk device 13 performs processing corresponding to a command from the upper control unit 9 while changing the seek speed or disk rotation speed on its own based on the judgment criteria.

Figure 3:
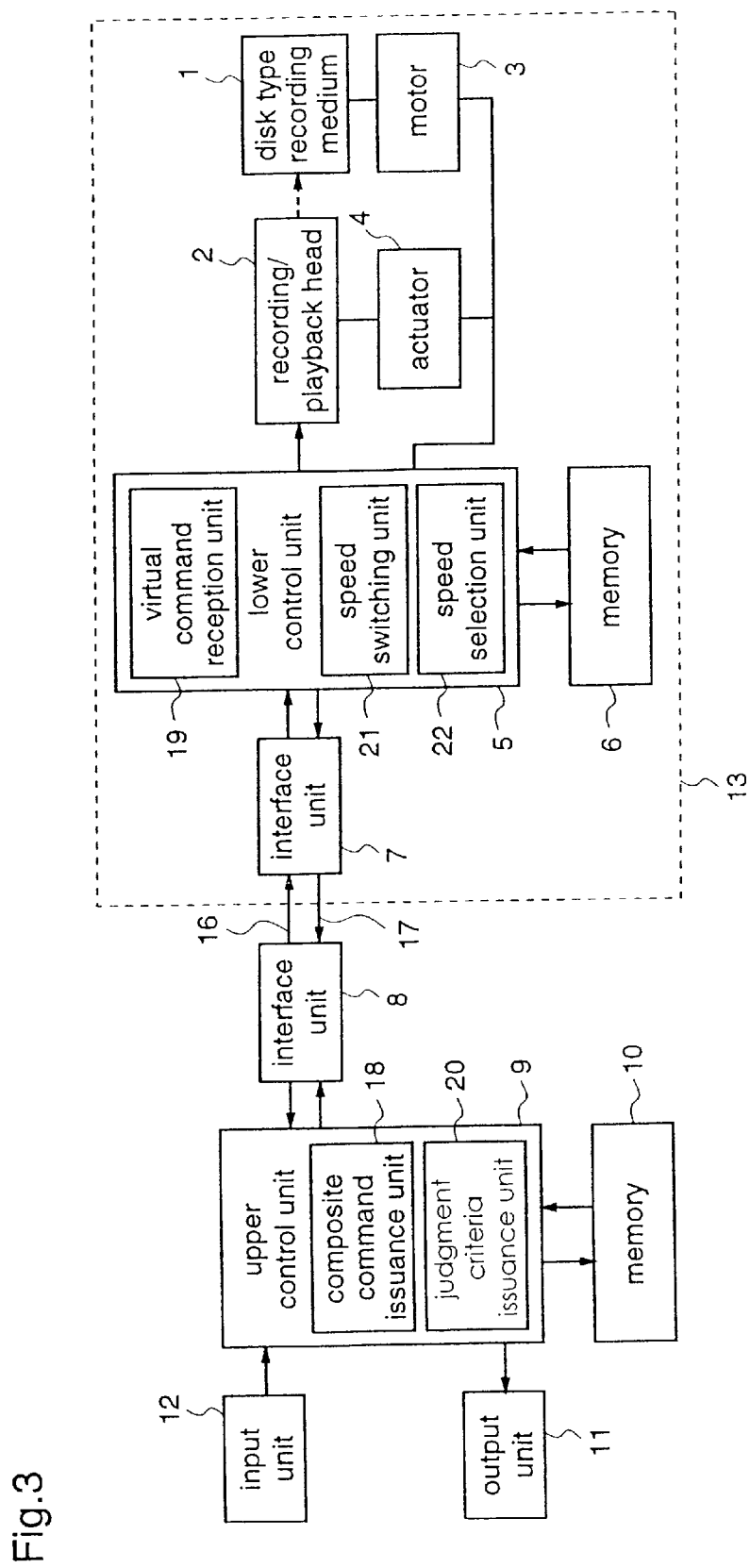
FIG. 3 is a block diagram of the recording/playback apparatus according to a second embodiment of the present invention.

First of all, the construction of the recording/playback apparatus according to the second embodiment will be described with reference to FIG. 3. FIG. 3 is a block diagram illustrating the recording/playback apparatus according to the second embodiment.

In FIG. 3, numeral 20 denotes a judgment criteria issuance unit for creating the judgment criteria for a seek speed or a disk rotation speed corresponding to the device performance that is desired by the operator of the recording/playback apparatus, and for issuing the criteria to the disk device 13. Numeral 22 denotes a speed selection unit for selecting an optimum seek speed or disk rotation speed on the basis of the judgment criteria. Numeral 21 denotes a speed switching unit for changing the seek speed or disk rotation speed to the seek speed or disk rotation speed that is selected by the speed selection unit 22. The same constituents as those shown in FIG. 1 for the first embodiment are given the same reference numerals, and a description thereof will be omitted.

Next, the criteria for judging a seek speed or a disk rotation speed of the recording/playback apparatus according to the second embodiment will be described with respect to two cases, assuming that the performance that is desired by the operator of the recording/playback apparatus is energy saving, and that the performance that is desired by the operator of the recording/playback apparatus is stillness. In this second embodiment, in the above-mentioned speed switching unit 21, the seek speed can be changed to two levels, "high speed" and "low speed", and the disk rotation speed can be changed to two levels, "low-speed rotation" and "high-speed rotation".

Initially, a description will be given of judgment criteria in the case where the device performance that is desired by the operator is energy saving.

In the speed switching unit 21 of the recording/playback apparatus, since the seek speed can be changed to two levels, when it is assumed that the power consumption at the high-speed seek is W1 while the power consumption at the low-speed seek is W2, the power consumption W2 at the low-speed seek is certainly smaller than the power consumption W1 at high-speed seek. Therefore, an expected value of the seek speed in this case is a low speed. Accordingly, the disk device 13 performs an operation while selecting the low-speed seek within a range which does not impair the continuity of data.

Further, in the speed switching unit 21, the disk rotation speed is also changeable to two levels, and the power consumption is certainly lower at the low-speed rotation than at the high-speed rotation. Therefore, an expected value of the disk rotation speed in this case is also the low-speed rotation. However, with respect to the disk rotation speed, an appropriate speed according to the contents of data processing should be selected.

That is, when data to be handled are continuous data such as video data and the content of processing is large such as for handling two sequences of continuous data at the same time, for example, when one sequence of continuous data is taken from the input unit 12 and written on the disk type recording medium 1 while the other sequence of continuous data is read from the disk type recording medium 1 and outputted from the output unit 11 to be viewed as an image, even if the expected value of the disk rotation speed is the "low-speed rotation", the high disk rotation speed might be impaired without the high disk rotation speed. On the other hand, when the content of processing is small such as for handling one sequence of data, for example, when only one sequence of data is read from the disk type recording medium 1 and outputted from the output unit 11, the continuity of data might not be impaired even when the disk rotation speed is set to the "low-speed rotation" as the expected value of the speed.

Hereinafter, a description will be given of conditional expressions for selecting an appropriate disk rotation speed according to the content of processing. For example, the power consumption per unit time, which is required when the disk rotation speed is the "high-speed rotation", is W3, a difference in the powers to be consumed per unit time, which are required for each of the high-speed rotation and the low-speed rotation, is $\Delta W3$, and the power consumption per unit time, which is required for the low-speed rotation, is W3−$\Delta W3$. Further, a difference in the powers to be consumed, which are additionally required as compared to being at high-speed rotation within the time required for deceleration to change the disk rotation speed from the high-speed rotation to the low-speed rotation, is $\Delta W4$, and a difference in powers to be consumed, which are additionally required as compared to being at high-speed rotation within the time required for acceleration to change the disk rotation speed from the low-speed rotation to the high-speed rotation, is $\Delta W5$. Further, in relation to the processing content, the time during which the disk should be rotated at high speed is T1, and the time during which the disk may be rotated at low speed is T2.

Initially, a difference $\Delta Wa$ in power consumption between the case where adjustable-speed rotation is carried out such that the disk is rotated for time T1 at the high speed and then decelerated and, thereafter, rotated for time T2 at the low speed and then accelerated, and the case where the high-speed rotation is maintained, can be expressed by (formula 1).

$$\Delta Wa = \{(W3 \times T1) + ((W3 - \Delta W3) \times T2) + \Delta W4 + \Delta W5\} - \{W3 \times (T1 + T2)\} \quad \text{(formula 1)}$$

The first term of (formula 1) shows the power-consumption in the case where acceleration and deceleration are carried out, and the second term shows the power consumption in the case where the high-speed rotation is maintained. When this formula is developed, (formula 2) is obtained.

$$\Delta Wa = \Delta W4 + \Delta W5 - \Delta W3 \times T2 \quad \text{(formula 2)}$$

Accordingly, in order to achieve energy saving as a device performance, it is advantageous that the disk rotation speed is not accelerated or decelerated when $\Delta Wa$ in (formula 2) is positive, and it is advantageous to accelerate or decelerate the disk rotation speed when $\Delta Wa$ is negative. Further, in (formula 2), as a conditional expression, since $\Delta W3$, $\Delta W4$, and $\Delta W5$ are constants that are inherent in the disk device 13, $\Delta W3$ becomes negative when time T2 during which low-speed rotation may be carried out is long, and therefore, it is considered that performing acceleration or deceleration during disk rotation is advantageous in regard to energy saving.

Therefore, when the performance that is desired by the operator of the recording/playback apparatus is energy saving, the judgment criteria to be set in the judgment criteria issuance unit 20 should include, as for the disk rotation speed, time T2 which allows $\Delta Wa$ to be 0 in (formula 2) or time T2 which is obtained by adding a margin to the former T2 and which allows $\Delta Wa$ to be a negative value, as a predetermined time. Further, as for the seek speed, the low speed should be selected within a range that does not degrade the continuity of data. The disk device 13 selects an optimum seek speed or disk rotation speed with the speed selection unit 22 on its own, i.e., by self-decision, on the basis of the above-described judgment criteria, and the disk device 13 changes the speed with the speed switching unit 21, whereby energy saving which is desired by the operator of the recording/playback apparatus is achieved while maintaining the continuity of continuous data such as video data in the recording/playback apparatus.

Next, a description will be given of criteria of the judgment in the case where the performance desired by the operator of the recording/playback apparatus is stillness.

Assuming that the seek speed can be changed to two levels by the speed switching unit 21, and since a seeking operation is more silent when the seek speed is low than when the seek speed is high, an expected value is a low speed when stillness is desired. Accordingly, as in the case for power consumption, the low speed should be selected within a range which does not degrade the continuity of data.

Further, it is assumed that the disk rotation speed can be changed to two levels by the speed switching unit 21. With respect to the disk rotation speed, the low-speed rotation and the high-speed rotation do not only have the respective levels of noises, but also discontinuous changes of noise occur at an accelerated rotation and a decelerated rotation, and there is a strong tendency that the evaluation of total stillness is entrusted to the auditory sense of human being. Accordingly, with respect to the disk rotation speed, it is required that the interval between the accelerated rotation and the decelerated rotation, i.e., each of the minimum time T1 for continuing the high-speed rotation and the minimum time T2 for continuing the low speed rotation, should be set by human sensitivity, according to the characteristics of the disk device 13, and not by quantitative computational expressions.

Therefore, when the performance that is desired by the operator of the recording/playback apparatus is stillness, the judgment criteria to be set in the judgment criteria issuance unit 20 should include, as for the disk rotation speed, the minimum time T1 for continuing the high-speed rotation and the minimum time T2 for continuing the low-speed rotation which are predetermined according to the characteristics of the disk device 13. Further, as for the seek speed, the low speed should be selected within a range that does not degrade the continuity of data. The disk device 13 selects an optimum seek speed or a disk rotation speed with the speed selection unit 22 by itself on the basis of the above-mentioned judgment criteria, whereby stillness that is desired by the operator of the recording/playback apparatus can be realized while maintaining the continuity of continuous data such as video data in the recording/playback apparatus.

Issuance of the judgment criteria from the judgment criteria issuance unit 20 of the upper control unit 9 to the disk device 13 may be carried out when the recording/playback apparatus starts up or when a different performance is selected by the operator of the apparatus.

As described above, in the recording/playback apparatus according to the second embodiment, even when there are a plurality of performances that are desired by the operator of the recording/playback apparatus, the judgment criteria issuance unit 20 of the upper control unit 9 creates judgment criteria including predetermined times based on the assumption that continuity of data should be maintained, and the judgment criteria issuance unit 20 sends the judgment criteria to the disk device 13. As a result, the disk device 13 selects, on the basis of the judgment criteria, an optimum seek speed or disk rotation speed with the speed selection unit 22 without degrading continuity of data, and the disk device 13 processes a command from the upper control unit 9 while changing the seek speed or disk rotation speed to the selected speed with the speed switching unit 21. As a result, the performances that are desired by the operator of the recording/playback apparatus can be achieved.

Third Embodiment

Hereinafter, a third embodiment of the present invention will be described.

A recording/playback apparatus according to the third embodiment sends, to the disk device 13, a composite command 16 comprising a real processing command and virtual command as well as expected time information relating to the composite command 16 (expected time, expected command interval, expected change time), in addition to the judgment criteria corresponding to the performance that is desired by the operator of the recording/playback apparatus as described for the second embodiment. Further, the disk device 13 of the recording/playback apparatus of the third embodiment operates while selecting an optimum seek speed or disk rotation speed on its own on the basis of the expected time information.

Figure 4:
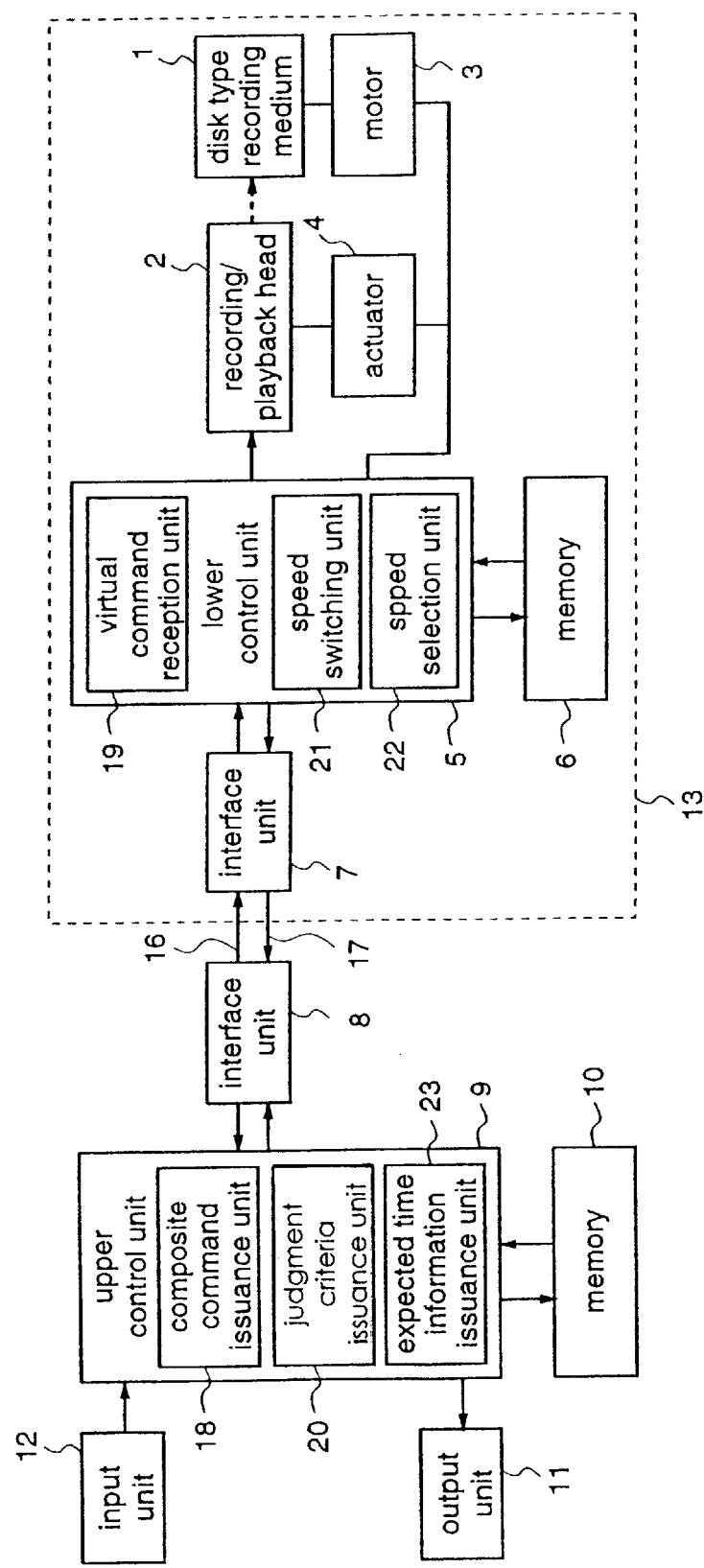
FIG. 4 is a block diagram of the recording/playback apparatus according to a third embodiment of the present invention.

Initially, the construction of the recording/playback apparatus according to the third embodiment will be described with reference to FIG. 4. FIG. 4 is a block diagram illustrating the recording/playback apparatus according to the third embodiment. In FIG. 4, the same constituents as those shown in FIG. 3 for the second embodiment are given the same reference numerals, and a description thereof will be omitted.

In FIG. 4, numeral 23 denotes an expected time information issuance unit for sending time information which is expected in relation to commands to be issued after commencement of a real processing command, together with the composite command 16, to the disk device 13. The expected time information comprises expected time T0, expected command intervals ΔTf and ΔTs, and expected change time Tc. The expected time T0 is an expected time that is to be elapsed between when the composite command 16 is issued and when the virtual command changes to an actual command, i.e., the real processing period. The expected command interval is an expected command issuance interval of a plurality of virtual commands which are to be issued during a set period of time from when execution of the real processing command is started. When the expected command interval changes from an interval to another interval during the above-mentioned set time, the former interval is a first expected command interval ΔTf while the latter interval is a second expected command interval ΔTs. The expected time change Tc is a time at which the interval is expected to change. Further, the set time is the predetermined time which is included in the judgment criteria as described in the second embodiment. When the device performance that is desired by the operator of the recording/playback apparatus is stillness, the set time is a time which is longer than the sum of the minimum time T1 for continuing the high-speed rotation and the minimum time T2 for continuing the low-speed rotation. When the device performance that is desired by the operator is energy saving, the set time is a time which is longer than the minimum time T2 for continuing the low-speed rotation.

Figure 5:
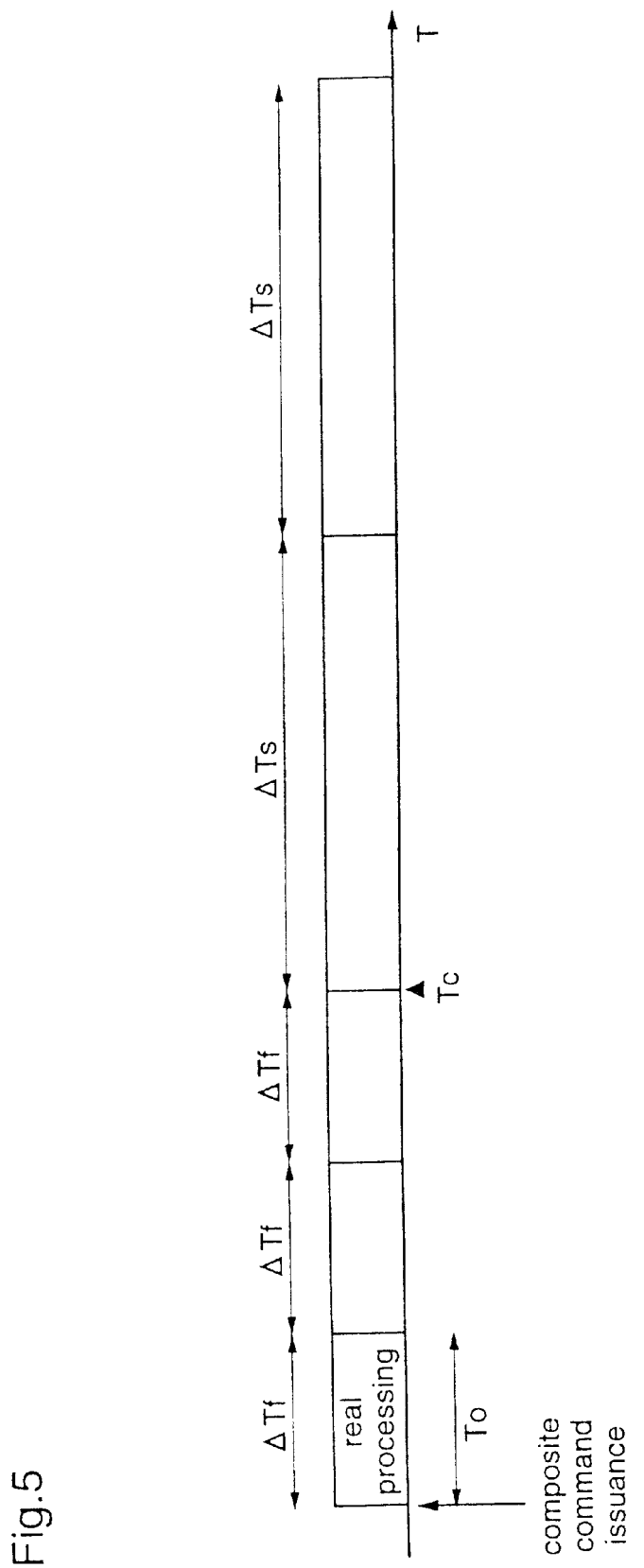
FIG. 5 is a diagram for explaining expected time information of the recording/playback apparatus according to the third embodiment of the present invention.

Hereinafter, the expected time information will be described more specifically with reference to FIG. 5. For example, it is assumed that the recording/playback device outputs, from the output unit 11, video data which are read from the disk type recording medium 1 of the disk device 13. It is also assumed, for example, that the recording/playback apparatus reproduces the video data while recording video data that are supplied from the input unit 12 in the disk device 13 by timer recording, and that the timer is canceled after time Ttm has passed. In this case, it is expected that a real processing command indicates data reading, a virtual command indicates data writing, and the reading and writing commands are alternately and continuously issued at approximately equal intervals ΔTf from the upper control unit 9 so as not to interrupt the video data. Further, when the timer is canceled after time Ttm has passed, it becomes unnecessary to output the data writing command, whereby the processing contents of the disk device 13 are reduced. Accordingly, it is expected that the commands will be issued at interval ΔTs, which is longer than the expected command interval ΔTf, from expected change time Tc at which time Ttm has passed since an issuance of the real processing command. In the above-mentioned specific example, the reason why the intervals of the commands are approximately equal intervals is because the transfer speeds of data such as video data are especially similar in one sequence and because such data are processed at approximately the same time. Therefore, these data are considered to be approximately the same data. Accordingly, the expected time T0 to be elapsed until the virtual command is changed to the real processing command is equal to ΔTf (T0=ΔTf). Further, when the command issuance intervals do not vary in the set time, the second expected command interval ΔTs is set at the same value as the first expected command interval ΔTf, and the expected change time Tc is set so as to have the same value as the set time.

Next, the operation of the recording/playback apparatus according to the third embodiment will be described.

Initially, a description will be given of the case where the device performance that is desired by the operator of the recording/playback apparatus is energy saving. Since the effect of energy saving is obtained when the seek speed is lowered, only the seek speed is changed by the speed switching unit 21 here.

Figure 6:
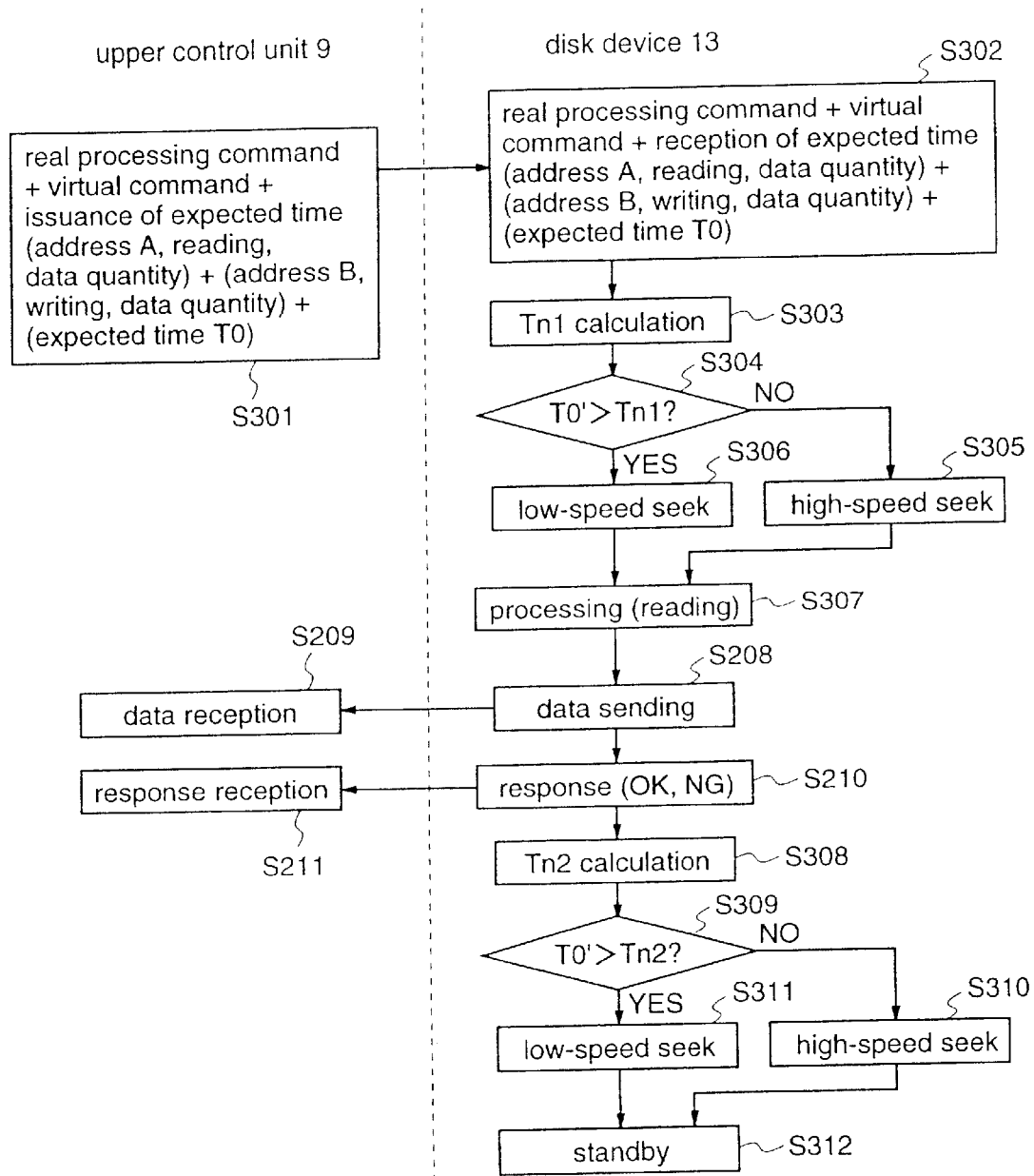
FIG. 6 is a flowchart illustrating an operation when performance that is desired by an operator of the recording/playback apparatus is energy saving according to the third embodiment of the present invention.

FIG. 6 is a flowchart illustrating a series of operations in the case where the device performance that is desired by the operator is energy saving in the recording/playback apparatus according to the third embodiment.

The judgment criteria in the case where the device performance that is desired by the operator is energy saving are as already described above for the second embodiment, and an exchange of the judgment criteria between the judgment criteria issuance unit 20 and the disk device 13 should be carried out when the recording/playback apparatus starts up (not shown). Although steps S204, S206, and S207 shown in FIG. 2 also work similarly in FIG. 6, these steps will be omitted in FIG. 6 so as to simplify the description.

Furthermore, in the third embodiment, it is also assumed that the real processing command is a command for reading data from address A on the disk type recording medium 1, and that the virtual command is a command for writing data stored in the memory 10 into address B on the disk type recording medium 1.

With reference to FIG. 6, initially, in step S301, the expected time information issuance unit 23 of the upper control unit 9 expects the expected time T0 from when the composite command issuance unit 18 issues the composite command 16 to when the virtual command in the composite command 16 changes to an actual processing command, i.e., the real processing command to be newly issued. Thereafter, the expected time information issuance unit 23 sends the expected time T0 to the disk device 13 together with the composite command 16. In step S302, the lower control unit 5 of the disk device 13 receives the composite command 16 and the expected time T0. In step S303, the lower control unit 5 calculates a processing time Tn1 which is required until terminating the real processing command at the seek speed corresponding to the device performance that is desired by the operator on the basis of a difference between the current address on the disk type recording medium 1 at which the recording/playback head 2 is currently positioned and the address A of the real processing command, the current disk rotation speed, and the quantity of data to be processed. Since the expected value of the seek speed is the low speed, the processing time Tn1 is a time that is obtained by giving a margin to the processing time in the case where the low-speed seek is selected. In step S304, the lower control unit 5 compares the processing time Tn1 with a remaining time T0' until the end of the process corresponding to the real processing command, which remaining time TØ' is obtained by subtracting the elapsed time beginning at the issuance of the composite command 16 from the expected time T0. When the remaining time T0' is larger than the processing time Tn1, the lower control unit 5 judges that the low seek speed is to be selected, because the continuity of data is not degraded even when the low seek speed is selected. When the remaining time T0' is smaller than the processing time Tn1, the lower control unit 5 judges that the high seek speed is to be selected.

When the seek speed may be the low speed, step S304 is followed by step S306 wherein the low-speed seek is carried out. On the other hand, when the high-speed seek is required, the operation goes to step S305 wherein the high-speed seek is carried out. When a seek is completed at the address A on the disk type recording medium 1, the process indicated by the real processing command, i.e., data reading, is carried out in step S307. The subsequent steps S208 to S211 are identical to the operations as shown in FIG. 2 and as described above in the first embodiment and, therefore, a description thereof will be omitted.

When it is checked that the process corresponding to the real processing command is completed by the upper control unit 9 in step S211, the disk device 13 proceeds to the operation corresponding to the virtual command.

To be specific, in step S308, the disk device 13 calculates respective processing times in both of the cases where the high-speed seek and the low-speed seek are carried out from the current address A to the target address B on the basis of a difference between the current address A on the disk type recording medium 1 at which the recording/playback head 2 is currently positioned and the address B of the virtual command, the current disk rotation speed, and the quantity of data to be processed. Thereafter, the disk device 13 calculates a processing time Tn2 using the two processing times. In contrast to the processing time Tn1, the processing time Tn2 may be any value larger than a difference Tn2' between the processing time in the case where the high-speed seek is carried out and the processing time in the case where the low-speed seek is carried out. Accordingly, the above-mentioned processing time Tn2 is a value that is obtained by giving a certain margin to the obtained difference Tn2'. The reason therefore is as follows. While the processing time Tn1 corresponds to the real processing command, the processing time Tn2 corresponds to the virtual command for performing an operation before changing to the actual processing, and therefore, even when, for example, the low-speed seek is carried out from the current address A to the target address B of the virtual command, the continuity of data is not degraded when the high-speed seek is carried out to the target address B from when the expected time T0 has passed as long as the difference Tn2' time is included in the expected time T0. The reason therefore is as follows. When the remaining time T0' is larger than the difference Tn2', the time to reach the target address B is shorter in the case where the low-speed seek to the target address B is carried out during the remaining time T0', and the high-speed seek to the target address B is carried out when the remaining time T0' becomes zero and the virtual command changes to the real processing command, than in the case where the high-speed seek is carried out to the target address B after the real processing command for writing the data in the address B is first issued after the processing of the above-mentioned real processing command has ended.

For the reason described above, the processing time Tn2 and the remaining time T0' are compared in step S309, and when the remaining time T0' is larger than the processing time Tn2, the operation goes to step S311 wherein the recording/playback head is moved with low-speed seek. When the remaining time T0' is smaller than the processing time Tn2, the operation goes to step S310 wherein the head is moved with high-speed seek.

After the seek to the address B on the disk type recording medium 1 is completed, the virtual command changes to the real processing command in step S312, and the disk device waits for a command to be issued from the upper control unit 9.

Therefore, when the device performance that is desired by the operator of the recording/playback apparatus is energy saving, the processing times Tn1 and Tn2, the remaining time T0' and the like are obtained from the composite command 16, the judgment criteria, and the expected time T0, whereby an optimum seek speed which realizes energy saving that is desired by the operator of the apparatus can be selected so as to operate the apparatus while maintaining the continuity of continuous data such as video data.

Next, a description will be given of the case where the device performance that is desired by the operator is stillness. Since the effect of stillness is obtained when the disk rotation speed is the low-speed rotation, the seek speed or disk rotation speed is changed by the speed switching unit 21.

Figure 7:
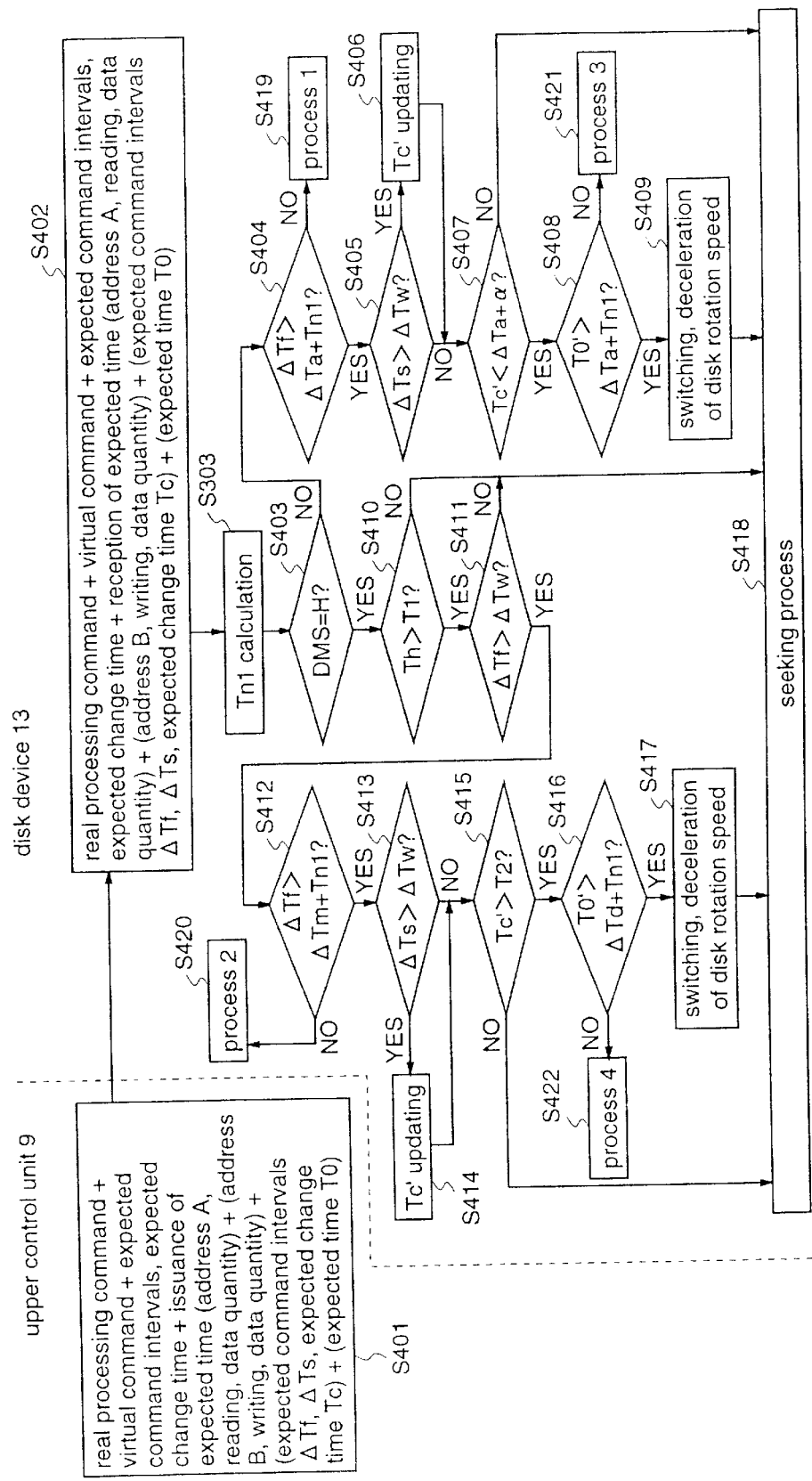
FIG. 7 is a flowchart illustrating an operation when a performance that is desired by an operator of the recording/playback apparatus is stillness according to the third embodiment of the present invention.
Figure 8:
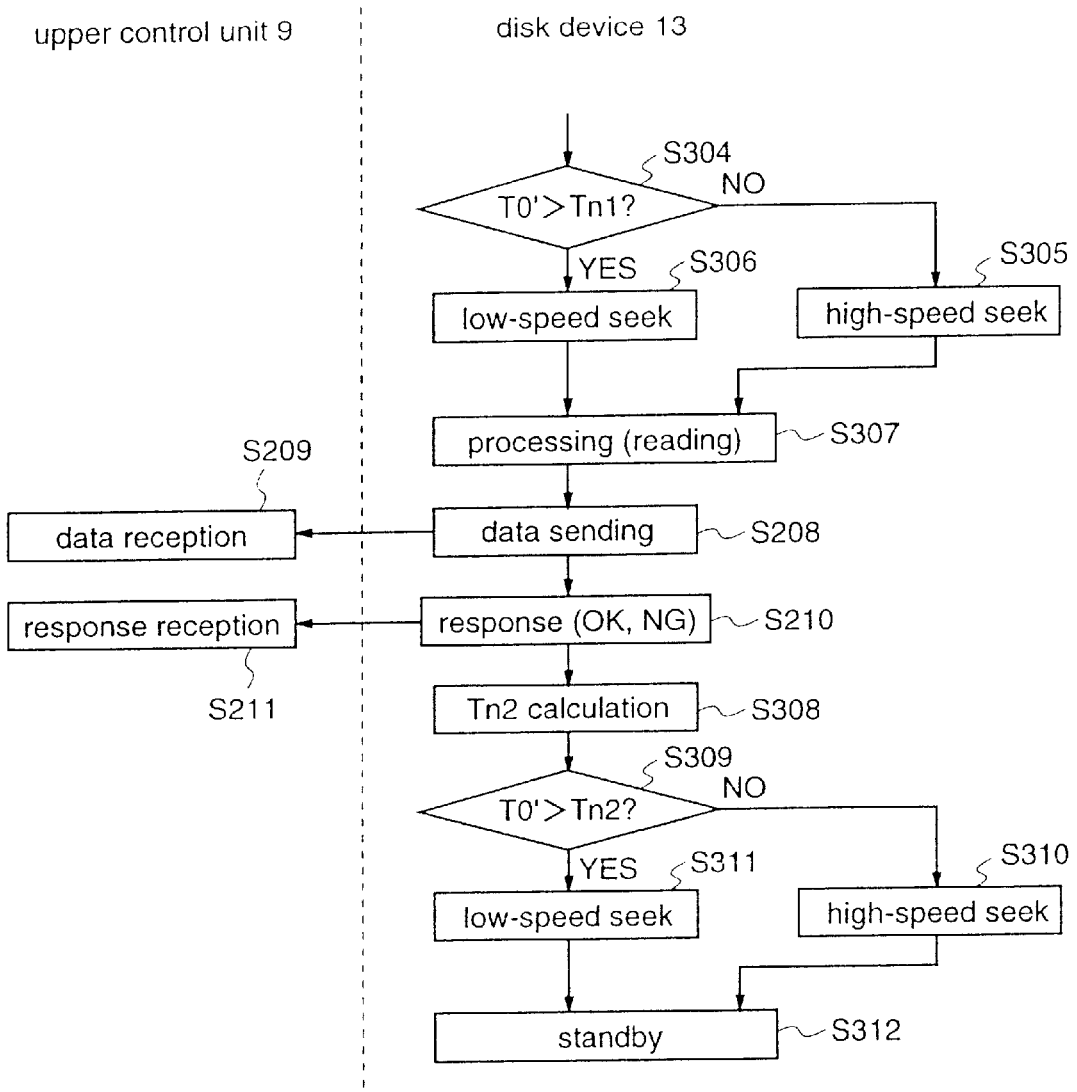
FIG. 8 is a flowchart illustrating an operation of the recording/playback apparatus in step S418 according to the third embodiment of the present invention.

FIG. 7. is a flowchart illustrating a series of operations in the case where the device performance that is desired by the operator is stillness in the recording/playback apparatus according to the third embodiment, and FIG. 8 is a flowchart illustrating the operation in step S418 of FIG. 7 in more detail.

With reference to FIG. 7, initially, in step S401, the expected time information issuance unit 23 of the upper control unit 9 transmits the expected time T0, the first expected command interval $\Delta Tf$, the second expected command interval $\Delta Ts$, and the expected change time Tc as mentioned above, together with the composite command 16, to the disk device 13. Then, in step S402, the lower control unit 5 of the disk device 13 receives such transmitted information.

In step S303, the processing time Tn1 which is required for seeking and processing is calculated by the same processing as described for step S303 of FIG. 6 without expecting the required time for switching the disk rotation speed. The processing time Tn1 is a time that is obtained by giving a margin to the processing time in the case where the low-speed seek is selected, because the expected value of the seek speed is a low speed in the case where the desired device performance is stillness.

In step S403, it is judged whether the current disk rotation speed (DMS) is a high-speed rotation (H) or not. The operation goes to step S410 when the DMS is the high-speed rotation, and goes to step the operation S404 when the DMS is the low-speed rotation.

Hereinafter, a description will be initially given to the case where the current disk rotation speed (DMS) is the low speed.

When it is judged in step S403 that the current disk rotation speed is the low speed, it is checked in step S404 whether enough time to maintain the continuity of data will be left or not when the disk rotation speed is accelerated from the low-speed rotation to the high-speed rotation. That is, the first expected command interval $\Delta Tf$ is compared with the sum of the time $\Delta Ta$ that is required for accelerating the disk rotation speed from the low-speed rotation to the high-speed rotation and the processing time Tn1 that is required for performing the processing at the high rotation speed after the disk rotation speed has changed into the high-speed rotation. In a case of $\Delta Tf > \Delta Ta + Tn1$, it is judged that the continuity of data can be maintained when the disk rotation speed is switched to the high-speed rotation during the first expected command interval $\Delta Tf$, and the disk device 13 goes to step S405. In a case of $\Delta Tf < \Delta Ta + Tn1$, it is judged that the continuity of data cannot be maintained even when the disk rotation speed is switched to the high-speed rotation during the first expected command interval $\Delta Tf$, and the disk device 13 goes to a process 1 in step S419. The case where the device goes to the process 1 in step S419 is identical to the case where the expected speed change time Tc, at which time the continuity of data may be degraded unless the disk rotation speed is switched to the high-speed rotation, approaches. In the process 1, this approach is informed to the upper control unit 9, and the upper control unit 9 performs processing for setting the expected time T0 again before Tc−($\Delta Ta + \alpha$) becomes zero, thereby providing a sufficient expected time T0 which allows for switching of the disk rotation speed.

Further, in a case of $\Delta Tf > \Delta Ta + Tn1$ in step S404 and when the operation goes to step S405, it is judged in step S405 whether or not the second expected command interval $\Delta Ts$ is a short command interval at which the disk rotation speed must be the high speed. That is, it is judged whether or not the second expected command interval is larger than a predetermined time $\Delta Tw$ which does not degrade the continuity of data to be processed even when the disk rotation speed is the low speed during the second expected command interval $\Delta Ts$. When the second expected command interval $\Delta Ts$ is larger than the $\Delta Tw$, the operation goes to step S406 because there is no need to change the disk rotation speed from the low speed to the high speed, and the remaining time Tc' is updated by extending then remaining time Tc' up to a break point of the second expected command interval $\Delta Ts$. Further, when the second expected command interval $\Delta Ts$ is smaller than $\Delta Tw$, since there is a need to change the disk rotation speed from the low speed to the high speed, the operation goes to step S407 while maintaining the remaining time Tc' from this point of time to the expected change time Tc. In step S407, it is judged whether the present time is in the time zone in which the disk rotation speed must be changed, i.e., whether the remaining time Tc' up to the expected change time Tc becomes smaller than the time which is obtained by adding a margin $\alpha$ to the time $\Delta Ta$ that is required for acceleration. When the remaining time Tc' is smaller than that time, the operation goes to step S408 because switching of the disk rotation speed is necessary; otherwise, the operation goes to step S418 because switching of the disk rotation speed is not necessary yet, and the seeking process is continued with the low-speed rotation.

In step S408 where switching of the disk rotation speed is necessary, it is checked whether the continuity of data can be maintained even when the disk rotation speed is changed in the current processing. That is, the sum of the time $\Delta Ta$ that is required for accelerating the disk rotation speed and the processing time Tn1 that is required for the processing after the high-speed rotation has been achieved is compared with the remaining time T0' which is subtracted from the expected time T0 with the passage of time. When the remaining time T0' is larger than this sum, it is judged that the continuity of data can be temporally maintained, and the operation moves to step S409. When the remaining time T0' is smaller than this sum, it is judged that the continuity of data cannot be maintained, and the operation moves to step S421.

A process 3 in step S421 is not described in more detail, because the remaining time T0' should normally not be smaller than the sum in step S409 after steps S407 and S408. This process 3 is a special process in a case where it is in the above-described state, and more specifically, this process 3 is a reprocess for returning to this process upon setting a next sufficient expected time T0. In step S407, the margin $\alpha$ is made to have a temporal margin for performing this reprocess.

In step S409, when the disk rotation speed is accelerated, the disk rotation speed has changed to the high-speed rotation, and, after this is completed, the operation goes to step S418. Then, the seeking process is performed with the high-speed rotation. This seeking process in step S418 is expressed together with a series of processing, and this processing will be described with reference to FIG. 8.

With reference to FIG. 8, initially, in step S304, it is judged whether or not the remaining time T0' which is obtained by subtracting the time that is required for processes from step S401 to step S418 from the expected time T0 is larger than the time Tn1 that is calculated in step S303 of FIG. 7. When the remaining time T0' is larger than the time Tn1, the low-speed seek is carried out in step S306. When the remaining time T0' is smaller than the time Tn1, the high-speed seek is carried out in step S305. Reading, which is indicated by the real processing command, is performed in step S307, data are transmitted to the upper control unit 9 in step S208, and a response that the data transmission is completed is made in step S210. Further, the disk device 13 proceeds to the operation corresponding to the virtual command. In step S308, the processing time Tn2 is calculated by the similar process as in step S308 of FIG. 6. In step S309, either the high-speed seek or the low-speed seek is selected by comparing the processing time Tn2 to the remaining time T0', and the selected seek speed is executed in steps S310 and S311. Thereafter, in step S312, the disk device 13 waits for a command to be issued from the upper control unit 9. The above-described series of processes from step S304 to step S312 are collectively referred to as a seeking process step S418. Each step is identical to each step that is described in FIG. 6, respectively, and therefore, a detailed description thereof will be omitted.

Next, a description is given of the case where the disk rotation speed (DMS) is a high speed (H) in step S403.

In this case, the process moves from step S403 to step S410 (refer to FIG. 7), and a time limit of switching is checked, i.e., the minimum high-speed rotation continuing time T1 as described in the second embodiment is compared to an integrated value Th of the continuing time after the disk rotation speed has become the high-speed rotation. When Th is larger than the predetermined time T1, the high-speed rotation has been kept longer than the predetermined time T1, and therefore, the operation goes to step S411. When Th is smaller than the predetermined time T1, the continuing time is shorter than the minimum high-speed rotation continuing time T1, and therefore, the operation goes to step S418 wherein the seeking process is continued with the high-speed rotation. As for the integration of the integrated values Th, since further integration is not necessary after Th is integrated to the same value as T1, the integration may be stopped.

When it is judged that the high-speed rotation is kept longer than the predetermined time T1 in step S410, the first expected command interval ΔTf is compared with the predetermined time ΔTw which does not degrade the continuity of data to be processed even when the disk rotation speed is the low-speed rotation during the first expected command interval ΔTf. When the first expected command interval ΔTf is larger than the time ΔTw, it is judged that the continuity of data is not degraded even in a case of the low-speed rotation, and the operation goes to step S412. When the first expected command interval ΔTf is smaller than the time ΔTw, it is judged that the continuity of data is degraded in a case of the low-speed rotation, and the operation goes to step S418 wherein the seeking process is continued while maintaining the high-speed rotation.

In step S412, ΔTm is a larger value between the time ΔTa that is required for accelerating the disk rotation speed from the low-speed rotation to the high-speed rotation and the time that is required for decelerating the disk rotation speed from the high-speed rotation to the low-speed rotation, and it is checked whether or not both of the deceleration and acceleration of the disk rotation speed at the first expected command interval ΔTf are possible. That is, when the sum of the maximum time ΔTm that is required for acceleration and deceleration and the time Tn1 that is required for the subsequent processes is smaller than the first expected command interval ΔTf, the acceleration and deceleration of the disk rotation is temporally possible for maintaining the continuity of data, whereas there is less of a temporal less possibility in the opposite case.

In step S412, when it is judged that the acceleration and deceleration of the disk rotation speed are possible, the operation goes to step S413. When it is judged that the acceleration and deceleration of the disk rotation speed is impossible, the operation goes to a process 2 in step S420. The process 2 in step S420 is provided as a process which enables switching to the low-speed rotation even when the time for deceleration or acceleration of the disk rotation speed is not sufficiently obtained from the command interval that is issued by the upper control unit 9 as long as the time that is required for acceleration or deceleration can be generated in a range in which the upper control unit 9 can perform a control during when the disk rotation speed is the low-speed rotation.

Further, in step S413 where it is judged that the acceleration and deceleration of the disk rotation speed are possible in step S412, it is checked whether or not the second expected command interval ΔTs can maintain the continuity of data similar to the first expected command interval ΔTf even when the data rotation speed is decelerated. That is, it is judged whether the second expected command interval ΔTs is larger than the predetermined time ΔTw which does not degrade the continuity of data to be processed even when the disk rotation speed is the low-speed rotation. Here, when the second expected command interval ΔTs is larger than ΔTw, the operation goes to step S414. Since it is also not necessary to switch the disk rotation speed to the high-speed rotation after an end of the first expected command interval ΔTf, the remaining time Tc' until the expected change time Tc is updated so as to extend the remaining time Tc' up to a break point of the second expected command interval ΔTs, and thereafter, the operation goes to step S415. When the second expected command interval ΔTs is smaller than ΔTw, it is necessary to switch the disk rotation speed to the high-speed rotation, and therefore, the operation goes to step S415.

In step S415, the remaining time Tc' until the expected change time Tc is compared with the minimum low-speed rotation continuing time T2. When the remaining time Tc' is smaller than the minimum low-speed rotation continuing time T2, the low-speed rotation cannot be continued for a predetermined time, whereby the deceleration is impossible. Then, the operation goes to step S418, and the seeking process is carried out while maintaining the high-speed rotation. Further, when the remaining time Tc' is larger than the minimum low-speed rotation continuing time T2, the low-speed rotation can be continued for the predetermined time or more, whereby the deceleration is possible, and then the operation goes to step S416. This step S416 is similar to the case described in step S408, and the only difference between these steps is with respect to acceleration and deceleration. Therefore, the remaining time T0' of the expected time is compared with the sum of the time ΔTd that is required for decelerating the disk rotation speed and the time Tn1 that is required for the subsequent process which is performed with the low-speed rotation. When the remaining time T0' is larger than the sum, it is possible to decelerate the disk rotation speed and, therefore, the operation goes to step S417. When the remaining time T0' is smaller than the sum, it is impossible to decelerate the disk rotation speed and, therefore, the operation goes to step S422. In a process 4 in step S422, the sufficient expected time T0 is maintained similar to the process 3 in the step S421, and this process 4 is a reprocess for returning to the above-described processing.

Further, in step S417, the disk rotation speed is decelerated, and the operation goes to step S418 when the speed has become the low-speed rotation. The seeking process in the subsequent step S418 is as described above with reference to FIG. 8, and therefore, a description thereof will be omitted.

Therefore, when the device performance that is desired by the operator of the recording/playback apparatus is stillness, processing speed information of the disk device 13 such as the processing times Tn1 and Tn2 are obtained from the composite command 16, the judgment criteria, the first and second expected command intervals $\Delta Tf$ and $\Delta Ts$, the expected change time Tc, and the expected time T0, and an optimum seek speed or disk rotation speed for the device performance that is desired by the operator can be selected while maintaining the continuity of continuous data such as video data.

As described above, in the recording/playback apparatus according to the third embodiment, the upper control unit 9 sends the composite command 16 comprising the real processing command and the virtual command, as well as the expected time T0, the first and second expected command intervals $\Delta Tf$ and $\Delta Ts$, and the expected change time Tc, which are the expected time information, to the disk device 13. This disk device 13 performs operations corresponding to the real processing command and the virtual command by selecting the seek speed or the disk rotation speed by self decision based on these information and the judgment criteria corresponding to the device performance desired by the operator as described in the second embodiment. Therefore, data processing is carried out by selecting a more optimal seek speed or disk rotation speed for the device performance that is desired by the operator without impairing the continuity of data.

Further, in the third embodiment, when the device performance that is desired by the operator is energy saving, an operation in which the disk rotation speed is not switched was described with reference with FIG. 6, while the above-described processing similar to that discussed with reference to FIG. 7 should be performed when the disk rotation speed is also switched.

Fourth Embodiment

Hereinafter, a fourth embodiment according to the present invention will be described.

In the fourth embodiment, data processing is performed by using a memory 10 that is installed in the disk device 13, the expected time information as described in the third embodiment (first and second expected command intervals $\Delta Tf$, $\Delta Ts$, expected time T0, expected change time Tc) is more specifically explained on the basis of the processing speed in the data processing within the memory 10, and further, a response-to-virtual-command obtaining unit for receiving a response to the process indicated by the virtual command is installed in the upper control unit 9 of the recording/playback apparatus.

The memory 10 for temporarily storing data is mainly used in the following three cases so that the upper control unit 9 processes continuous data such as video data. That is, these cases are as follows: a case where the memory 10 is used for data processing; a case where data that are read from the disk type recording medium 1 are temporarily stored faster than the speed when data are outputted from an output unit 11 at an approximately constant speed, the data are taken from the memory 10 in accordance with the output speed to be outputted from the output unit, and the output data is deleted from the memory 10; and a case where data taken from an input unit 12 are temporarily stored, the data are sent to the disk device 13 in determined units or its multiple units, and the sent data are recorded on the disk type recording medium 1.

The case where the memory 10 is used only in one of the above-described cases, e.g., a case where it is used when the recording/playback apparatus performs one sequence of operations of temporarily storing the data that are taken from the input unit 12 in the memory 10, sending the data to the disk device 13 in determined units or its multiple units, and recording the sent data on the disk type recording medium 1, is not suitable for describing an optimum operation of the recording/playback apparatus. Therefore, a case where the memory 10 is used when relatively frequent data processing is necessary, e.g., a case where the memory 10 is used when the recording/playback apparatus performs two sequences of operations of reading data on the disk type recording medium 1 of the disk device 13 and outputting the read data through the output unit 11 so as to reproduce an image, as well as writing video data that are taken from the input unit 12 in the disk type recording medium 1, will be reviewed herein.

In the recording/playback apparatus which performs two sequences of operations, i.e., reproducing the above-mentioned image and writing the data in the disk type recording medium 1, the upper control unit 9 repeats processes of storing the data that are once read from the disk type recording medium 1 of the disk device 13 into the memory 10, temporally continuously consuming the data from the memory 10 by a required quantity while storing data to be inputted temporally continuously in the memory 10, transmitting this data to the disk device 13 at the point of time when the data has been stored to a certain quantity, and writing the data in the disk type recording medium 1.

Figure 10:
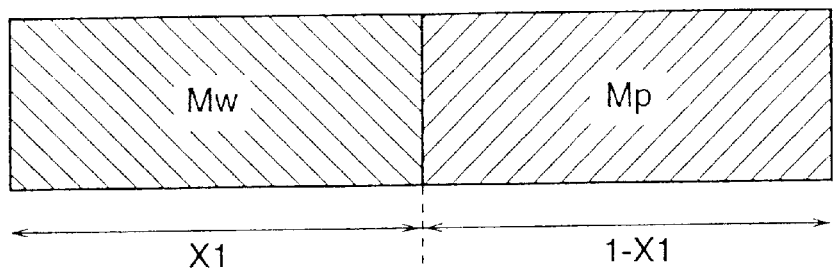
FIG. 10 is a diagram showing a capacity of a memory according to the fourth embodiment of the present invention.
Figure 10:
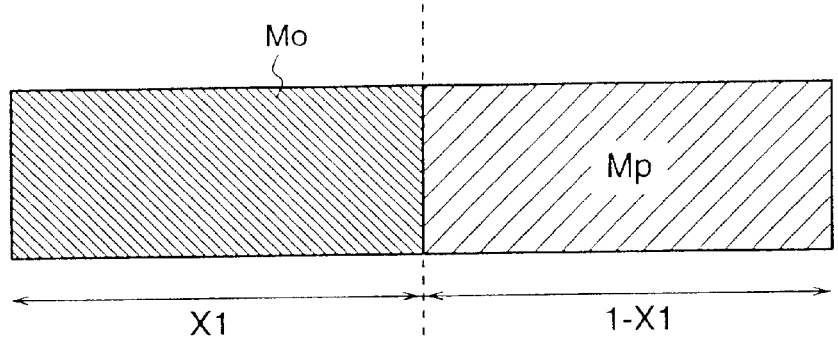
Figure 10:
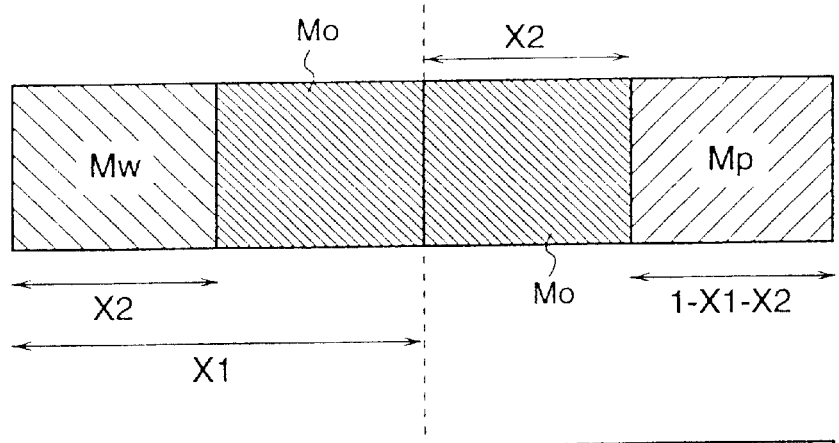
Figure 10:
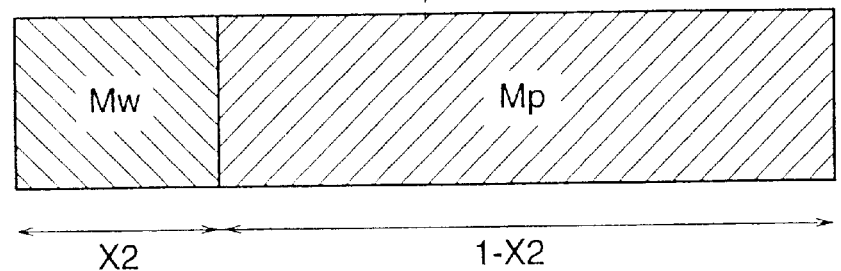

Here, with reference to FIG. 10, a case where two sequences of data are processed in the memory 10 will be described. FIG. 10 is a diagram imitatively illustrating a capacity of the memory 10.

In FIG. 10, a capacity which can be used for temporary storage excluding a quantity that is required for a process of the image of the memory 10 is M, a storage data quantity for image reproduction, which storage data quantity has been stored at the present stage and has time-serially been decreased, is Mp, a storage data quantity for recording, which storage data quantity has temporarily been stored to be written in the disk device 13 and has time-serially been increased, is Mw, and a free capacity which has not been used is Mo.

With respect to the continuous data such as video data, the recording/playback speed is usually expressed by a capacity which is used per unit time. Accordingly, it is considered that the storage data quantity Mp for image reproduction is consumed by $\Delta Mp$ per hour to be decreased, and the storage data amount Mw for recording is increased by $\Delta Mw$ per hour. When $\Delta Mw$ is larger than $\Delta Mp$, the free capacity Mo is decreased with time. Therefore, although it is necessary to set the free capacity Mo in accordance with a difference between them, it is assumed here, for the purpose of concision, that $\Delta Mp$ and $\Delta Mw$ are equal to each other and further a sufficient quantity for the difference is set as Mo.

Further, it is necessary to note the following two points to maintain the continuity of continuous data. That is, the first point is that data should be newly read from the disk type recording medium 1 of the disk device 13 by the time when the storage data quantity Mp for image reproduction is lost, and then, the read data should be supplied, because the continuity of image reproduction is degraded when the data for image reproduction in the memory 10 is lost. The second point is that the free capacity Mo of the memory 10 which stores data to be written in the disk device 13 should be prevented from being lost, because the continuity of continuous data to be recorded in the disk type recording medium 1 is degraded unless data can be stored in the memory 10. In view of the above-described two points, it is adopted, as a safe setting in the continuity of data, that a control is performed so as to write data in the disk type recording medium 1 as fast as possible in a state where the storage data quantity Mp for image reproduction is as large as possible and the storage data quantity Mw for recording is as small as possible when a recording unit is filled. In this case, however,.since a seeking operation must be performed for each small unit to be recorded, the number of seeking operations becomes huge.

Thus, it is supposed that the number of accesses from the upper control unit 9 to the disk device 13 is decreased as much as possible.

In order to perform data processing while maintaining the continuity of the data, operations of writing the storage data quantity Mw for recording on the memory 10 in the disk device 13 before the storage data quantity Mp for image reproduction is lost from the memory 10, so as to provide the free capacity Mo on the memory 10, and further, operations of obtaining data of Mp from the disk device 13 so as to store the data in the memory 10 are required.

Initially, it is assumed that two commands of writing and reading are successively performed and that the data of the storage data quantity Mp for image reproduction are maximally stored in the memory 10. A time Tp until the storage data quantity Mp for recording is lost on the memory 10 is Mp/ΔMp, and, in order to write data during the time Tp and to further read the data, the time Tp must be larger than the sum of a time Tws that is required for the seeking operation for the written address, a time Twt during which data to be written are transferred from the memory 10 to the disk device 13, a time Tww during which the data are written in the disk type recording medium 1, a seek time Trs for a read address, a time Trr during which the data are read from the disk type recording medium 1, and a time Trt during which the data are transferred to the memory 10. However, even when the seek reaches a track which is in a radial position of the disk type recording medium 1, a position on one periphery of a target address is not known. Therefore, a time Tm that is required for one rotation is anticipated as this rotational delay. Thus, (formula 3) is obtained as follows.

$$Tp > (Tws+Twt+Tww+Tm+\beta)+(Trs+Trr+Trt+Tm+\gamma) \quad \text{(formula 3)}$$

wherein β and γ are margin times in a case where the servo failed to be operated or the like. Further, in (formula 3), the right side is T(t), a time required for the writing of the first term in the parentheses is Tw(t), and a time required for the reading of the second term in the parentheses is Tr(t).

That is, the disk device 13 is operable only in a range in which the (formula 3) holds without impairing the continuous data. However, when the device 13 is attempted to operate as it is, β and γ, which are anticipated in the (formula 3), are larger values than the other terms, thereby causing a shortcoming that, in order to successively perform the seek operation twice, the successive operations must start while a remaining quantity of Mp is still large, and a shortcoming that, since writing and reading are successively performed, it is difficult to both operate beforehand in accordance with the virtual command and to select the operation speed within the set time.

So, it is supposed that writing and reading are unsuccessively performed at approximately equal intervals.

In FIG. 10, X1 and X2 are ratios when the capacity M is 1, and this capacity M is a capacity which can be used by Mp and Mw in the memory 10. FIG. 10(a) illustrates a state where Mw is stored by X1 and Mp is stored by (1−X1), among the capacity M of the memory 10. At this point of time, it is assumed that Mw is written in the disk device 13. In the capacity of the memory 10 at the point of time when writing is completed, as shown in FIG. 10(b), data Mw taken from the input unit 12 is 0. Next, FIG. 10(c) illustrates the state after some time has passed. While Mw is inputted from the input unit 12 so that Mw is increased to X2 within the memory 10 with the passage of time, Mp is sent to the output unit 11 so as to reproduce data, and as a result, Mp within the memory 10 is decreased to (1−X1−X2). Thus, Mp is read from the disk device 13 at this point of time to be stored in the memory, and FIG. 10(d) illustrates the state immediately after Mp has been stored in the memory 10.

That is, a time Twm from when Mw is written in the disk device 13 to when Mp is read is a time during which the state shifts like FIG. 10(b)→FIG. 10(c)→FIG. 10(d), resulting in Twm=M·X2/ΔMw. A time Tmw from when Mp is read from the disk device 13 to when Mw is written is a time during which the state shifts like FIG. 10(d)→FIG. 10(a)→FIG. 10(b), resulting in Tmw=M·(X1−X2)/ΔMw. It is assumed that commands of reading and writing are issued at equal intervals here, resulting in Twm=Tmw, thereby obtaining X1=2·X2. Mp in FIG. 10(c) is equal to (1−X1−X2)·M(Mp=(1−X1−X2)·M), and the above-described equation is substituted for this equation, resulting in Mp=(1−3·X2)·M. Since reading of Mp from the disk device 13 to the memory 10 must be earlier than outputting this Mp from the output unit 11 and losing the same on the memory 10, a time Tr(t) that is required for reading must be set under conditions of Tr(t)<(1−3·X2)·M/ΔMp.

Here, to be specific, when X1 is equal to 0.5 (X1=0.5), X2 is equal to 0.25 (X2=0.25) and a capacity of the memory 10 is M, data are written in the disk device 13 at the point of time of 0.5M, and the read data are stored up to 0.75M at the point of time when the remaining quantity of data read from the input unit 12 is up to 0.25M. Here, a calculation is simplified imitatively without considering a capacity deviation due to a time deviation in the time Tw(t) that is required for writing and a time deviation in the time Tr(t) that is required for reading. The reason therefor is as follows. The approximately equal command intervals allow the device to operate upon expecting the difference. In addition, there are sufficient command intervals, and further, an advance operation corresponding to the virtual command is performed, whereby it is supposed that the margins β and γ expected in (formula 3) are actually and drastically smaller than the expected values. The time intervals as the time Tmw and the time Twm, which intervals are set to be approximately equal to each other as described above, are sent to the disk device 13 as an expected time T0 when the virtual command changes to the real processing command. Then, the first expected command interval ΔTf becomes equal to the expected time T0.

When processing is performed in the memory 10 in this way, as long as the recording/playback apparatus records an input signal from the input unit 12 in the disk device 13 by timer recording while outputting data presently read from the disk device 13 from the output unit 11 to a display device, and further, as long as the timer recording is, scheduled to be canceled after Ttm, data processing in the memory 10 is only a reproduction after the time Ttm has passed, thereby drastically reducing the processing content. Therefore, a command interval after the time Ttm has passed becomes a value that is obtained by giving a margin to (M/ΔMp). This value is a second expected command interval ΔTs, and the expected change time Tc becomes Ttm at this time.

In this way, the upper control unit 9 creates the expected time information (first and second expected command intervals, ΔTf and ΔTs, the expected time T0, the expected change time Tc) on the basis of the processing content of continuous data, the speed at which the continuous data are processed in the memory 10, and processing speed information of the disk device 13, and the upper control unit 9 sends the same to the disk device 13, whereby the disk device 13 can perform an operation corresponding to the virtual command before an issuance of the next command while switching to the optimum seek speed or disk rotation speed without impairing the continuity of data.

Figure 9:
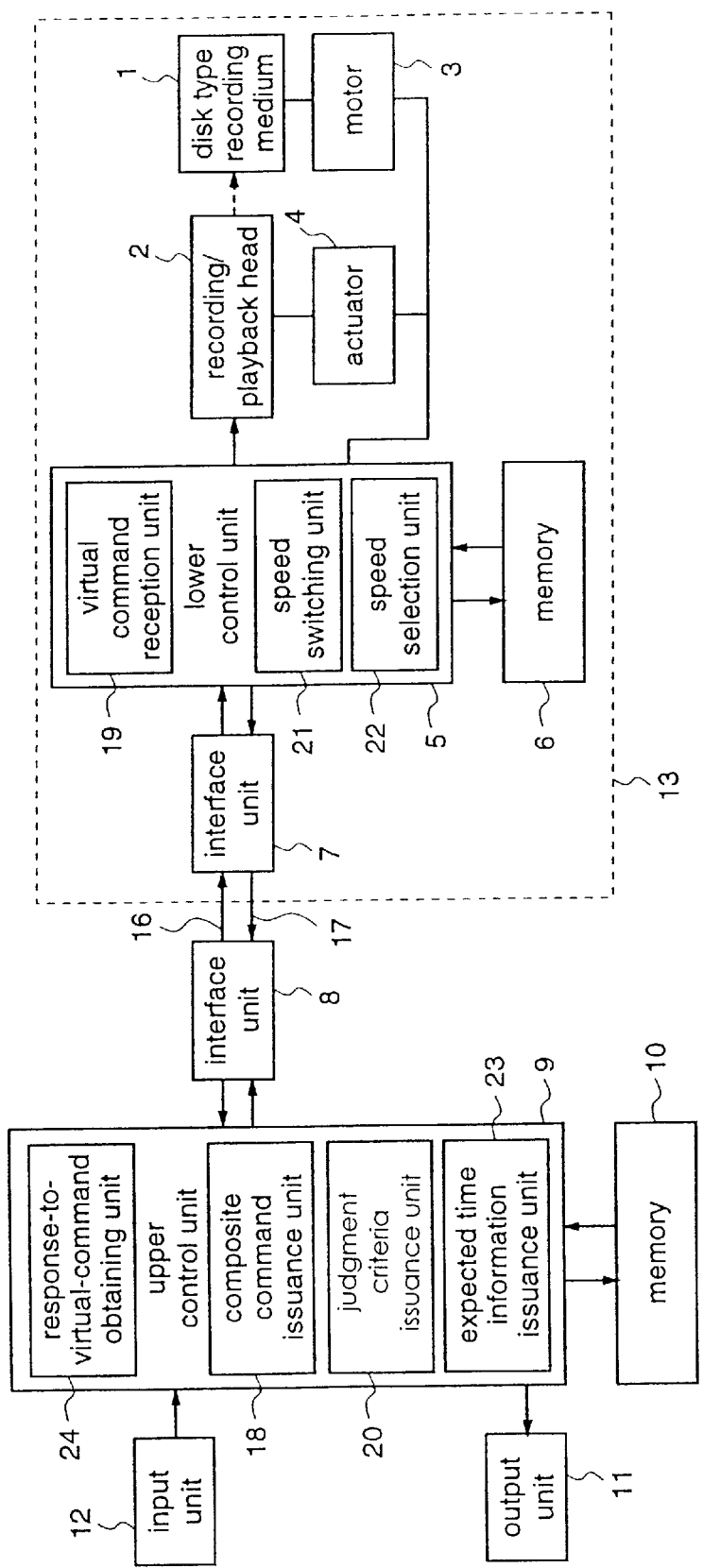
FIG. 9 is a block diagram of the recording/playback apparatus according to a fourth embodiment of the present invention.
Figure 11:
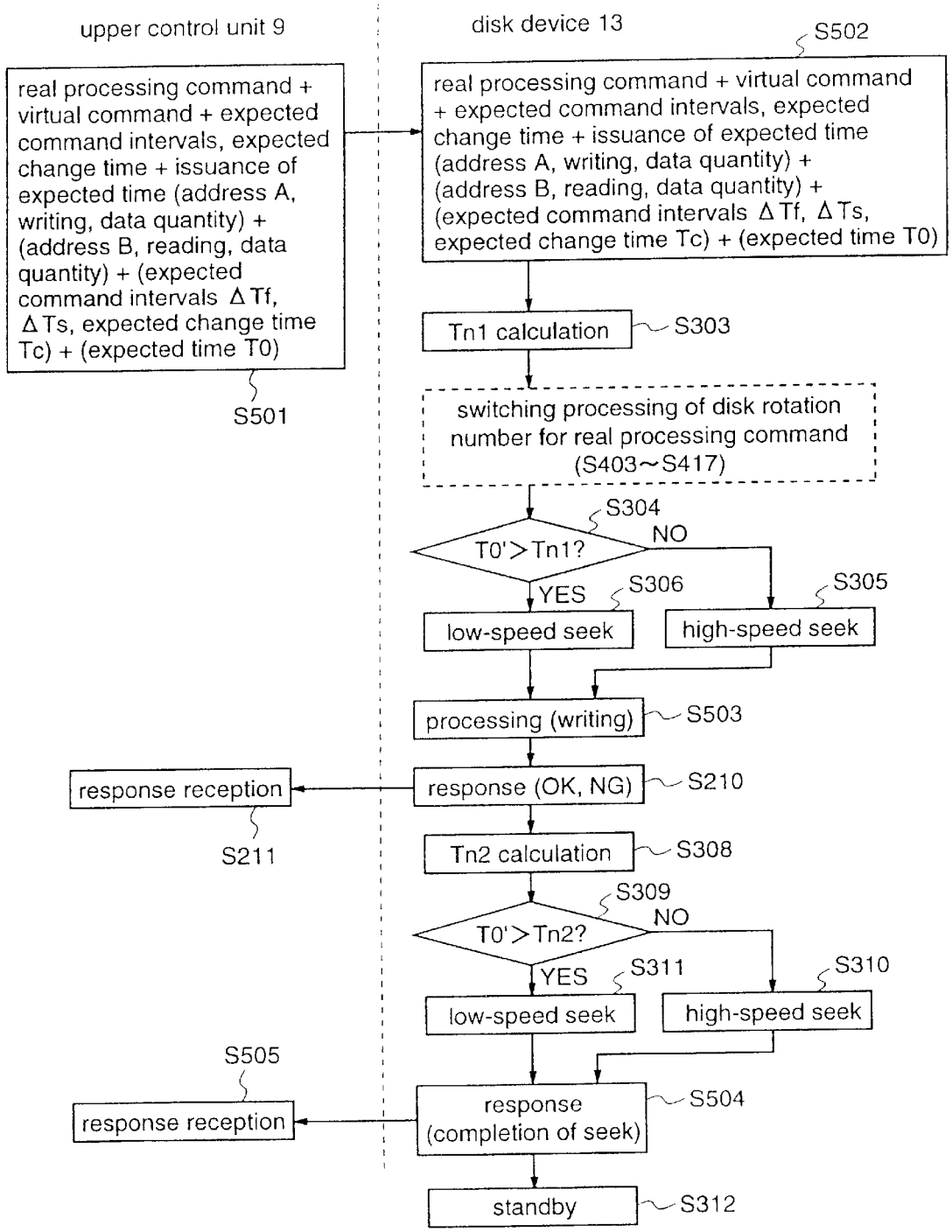
FIG. 11 is a flowchart illustrating an operation of the recording/playback apparatus according to the fourth embodiment of the present invention.

Next, with reference to FIGS. 9 to 11, a case will be specifically described in which the memory 10 performs data processing, as described above, where the disk device 13 responds to the upper control unit 9 concerning states of the respective operations with respect to an operation corresponding to the real processing command as well as an operation corresponding to the virtual command, and the upper control unit 9 provides a response-to-virtual-command obtaining unit 24 for obtaining this response. FIG. 9 is a block diagram of the recording/playback apparatus according to the fourth embodiment, and FIG. 11 is a flowchart illustrating an operation of the recording/playback apparatus according to the fourth embodiment. In FIG. 9, numeral 24 denotes a response-to-virtual-command obtaining unit for receiving a response to the respective operations indicated by the virtual command. The same constituents as those shown in FIG. 4 for the third embodiment are given the same reference numerals, and a description thereof will be omitted.

Further, in a response 17 in FIG. 9 according to the fourth embodiment, not only a response to the virtual command but also a requirement for the process corresponding to the virtual command are added to a response to the real processing command.

FIG. 11 is a flowchart illustrating an operation in a case where it is assumed that, when the memory 10 is in a state shown in FIG. 10(a), it is expected that it is necessary to write the storage data quantity Mw for recording in the disk device 13, and then, when a state of the memory 10 changes to a state shown in FIG. 10(c), it is expected that it is necessary to read the storage data quantity Mp for image reproduction from the disk device 13 and increase the Mp so as to be in a state shown in FIG. 10(d). Thus, in FIG. 11, in step S501, the real processing command of writing the storage data quantity Mw for recording within the memory 10 in the disk device 13, the virtual command of reading the storage data quantity Mp for image reproduction within the memory 10 upon specifying a start address on the disk type recording medium 1 of the disk device and the read quantity, together with the expected time T0, the first and second expected command intervals ΔTf and ΔTs, and the expected change time Tc which are set as described above when an input signal from the input unit 12 is recorded in the disk device 13 by timer recording, where it is expected that the timer is canceled after Ttm, (more specifically, T0=ΔTf= M·X2/ΔMw, ΔTs=(M/ΔMp)+σ (σ: margin time), Tc=Ttm) are sent to the disk device 13, and the disk device 13 receives such data in step S502. Although it is not shown in FIG. 11, with respect to the real processing command, as described in FIG. 7 according to the third embodiment, the disk rotation speed is switched on the basis of the given expected time information. Further, the seek and movement are performed while switching the seek speed in steps S303 to S306, and writing of the real processing command is performed in step S503. When this is completed, a response is made to the upper control unit 9 in step S210. Thereafter, in steps S308 to S311, as a process corresponding to the virtual command, while the seek speed is switched, the seek and movement are performed to an address where Mp on the disk type recording medium is read. A response informing that the seek and movement in response to the virtual command is completed is made to the upper control unit 9 in step S504. The response-to-virtual-command obtaining unit 24 of the upper control unit 9 receives this response in step S505, and thereafter, the response-to-virtual-command obtaining unit 24 goes to a standby state in step S312.

In this way, when the response-to-virtual-command obtaining unit 24 of the upper control unit 9 receives information concerning the process corresponding to the virtual command in the disk device, since the upper control unit 9 recognizes that the seek has already been completed, the time Trs that is required for the seek is not necessary to be expected in the time Tr(t) that is required for reading in the above-described (formula 3), and further, a state where the servo has already been operated is obtained. Therefore, the margin time γ can also be expected to be drastically small, and Tr(t) is judged as in the following (formula 4).

$$Tr(t)=Trr+Trt+\gamma'(\gamma>\gamma') \qquad \text{(formula 4)}$$

That is, in a case where a response to the virtual command is not made, the quantity of Mp remaining in the memory 10 is in a state of FIG. 10, i.e., it is equal to (1−X1−X2)·M, the storage data quantity Mp for image reproduction is read from the disk device 13 so as to maintain the continuity of data, and the virtual command which makes Mp filled in the memory 10 so as to be in a state of FIG. 10(d) is scheduled with the processing time of the disk device 13 and the expected margin time. However, as long as a response to the virtual command is made, in the response-to-virtual-command obtaining unit 24 of the upper control unit 9, the disk device 13 is capable of recognizing that the seek in response to the virtual command is completed and a state where the servo has already been operated is obtained. Therefore, the upper control unit 9 can calculate the time that is required for processes corresponding to the virtual command again, and the upper control unit 9 judges that, even when an issuance of a command of reading data from the disk device 13 as the next real processing command which has been the virtual command is delayed until the storage data quantity Mp for image reproduction in the memory 10 becomes smaller, processing is possible without impairing the continuity of data.

In this way, the disk device 13 outputs a response 17 to the respective operations in the process corresponding to the virtual command to the upper control unit 9, and the upper control unit 9 obtains the response 17 in the response-to-virtual-command obtaining unit 24, whereby the upper control unit 9 can perform a control except for a temporal margin that is expected for maintaining the continuity of continuous data. Therefore, a control having a large degree of freedom is possible in the processing of the memory 10.

As described above, in the recording/playback apparatus according to the fourth embodiment, the upper control unit 9 creates the expected time information (the expected time T0, the first and second command intervals ΔTf and ΔTs, the expected change time Tc) on the basis of the processing content of continuous data, the speed at which the continuous data are processed in the memory, and the processing speed information Tn1 and Tn2 of the disk device so as to send the same to the disk device 13, whereby the disk device 13 can perform an operation before an issuance of the next command while switching to the optimum operation speed without impairing the continuity of data. Further, the disk device 13 responds to the upper control unit 9 with respect to the respective operations of processes corresponding to the virtual command in the processing operations corresponding to the virtual command, and the upper control unit 9 obtains these responses in the response-to-virtual-command obtaining unit 24, whereby the upper control unit 9 can perform a control except for a temporal margin that is expected for maintaining the continuity of continuous data. Therefore, a control having a degree of freedom is possible in the processing of the memory 10.

Fifth Embodiment

Hereinafter, a fifth embodiment of the present invention will be described.

In this fifth embodiment, an operation of the recording/playback apparatus when the virtual command changes to the real processing command to be carried out will be described with respect to each of a case where the virtual command indicates reading of data and a case where the virtual command indicates writing of data. A construction of the recording/playback apparatus of the fifth embodiment is similar to that of the fourth embodiment.

Figure 12:
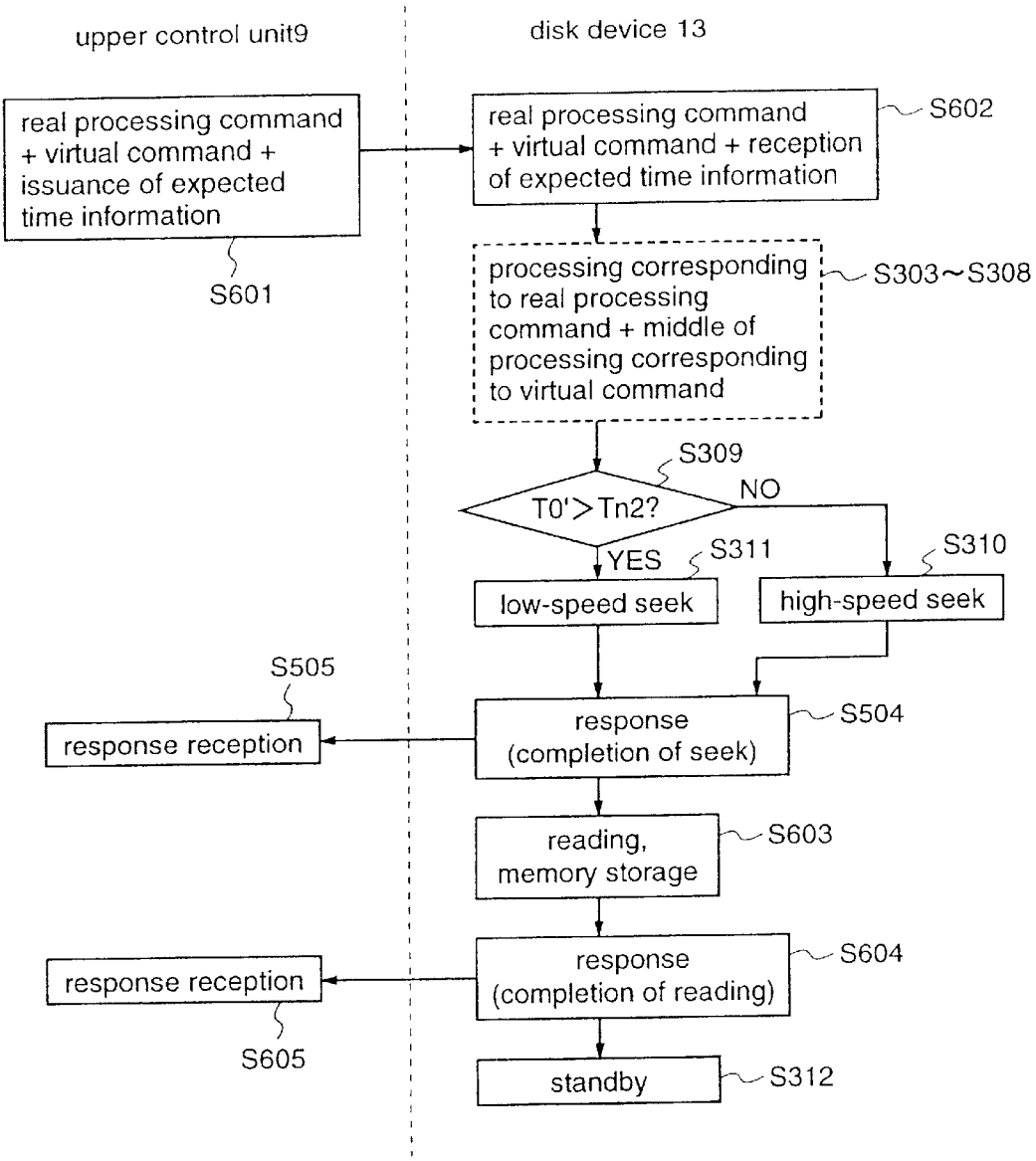
FIG. 12 is a flowchart illustrating an operation when a virtual command indicates reading in the recording/playback apparatus according to a fifth embodiment of the present invention.

Initially, a description will be given of a case where the virtual command indicates reading of data with reference to FIG. 12. FIG. 12 is a flowchart illustrating an operation when the virtual command indicates reading.

A description of steps S601–S311 will be omitted here, because, in FIG. 12, these steps go through the same processes as in the above-described embodiments. The expected time information in steps S601 and S602 indicate the expected time T0, the expected command intervals ΔTf and ΔTs, and the expected change time Tc.

First of all, in steps S601–S311, processes corresponding to the real processing command and the virtual command are performed. As described in the fourth embodiment, at the point of time when the seeking operation corresponding to the virtual command is completed, a response is made to the upper control unit 9 in step S504, and the response-to-virtual-command obtaining unit 24 of the upper control unit 9 receives the response in step S505.

While a standby state is obtained at the point of time when a response to the virtual command has been made to the control unit 9 in the above-described FIG. 11, the standby state is not obtained in the fifth embodiment, data which are scheduled to be sent from the disk type recording medium 1 to the upper control unit 9 are read, and the data are stored in the memory 6 of the disk device 13. When the data are stored in the memory 6, in a case where the entire quantity of data to be transmitted, which quantity has been expected by the virtual command, has not been able to be stored in the memory 6, the data quantity is stored halfway in the memory 6. As described above, at the point of time when data are stored in the memory 6, the response is made to the upper control unit 9 in step S604, and the response-to-virtual-command obtaining unit 24 of the upper control unit 9 receives this response in step S605. After completion of the response, the disk device 13 proceeds to a standby state where the disk device 13 waits for a command from the upper control unit 9 in step S312.

Further, although a detailed description is not given above, when the entire capacity of the data included in the virtual command has not been able to be stored in the memory 6 in data reading in step S603, the disk device 13 stores a head address of the data which has not been read yet, and the recording/playback head 2 stands by in a track having this address and enables a reading operation to be continued from this address after an issuance of the real processing command.

Figure 13:
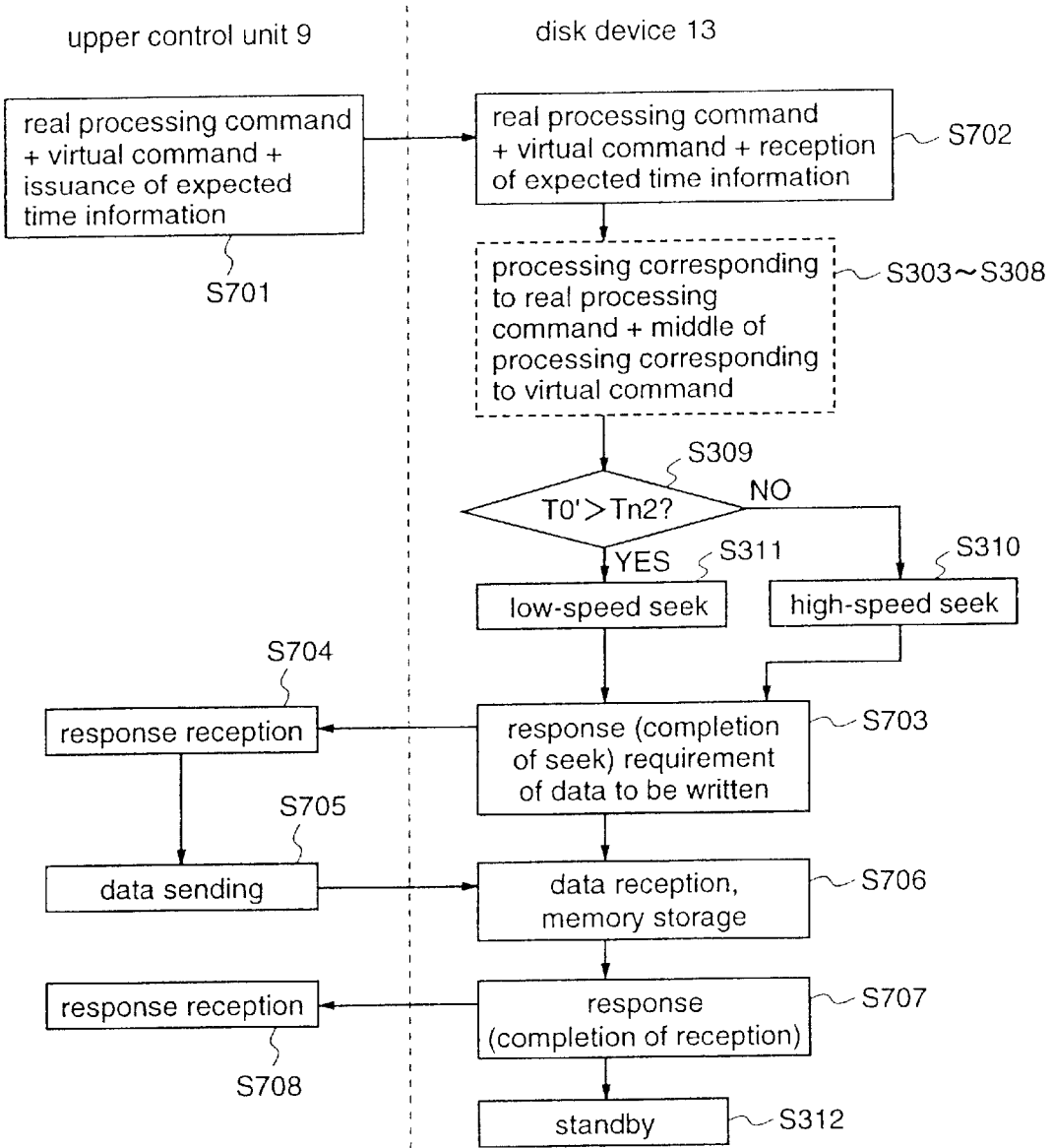
FIG. 13 is a flowchart illustrating an operation when the virtual command indicates writing in the recording/playback apparatus according to the fifth embodiment of the present invention.

Next, a case where the virtual command indicates writing will be described with reference to FIG. 13. FIG. 13 is a flowchart illustrating an operation when the virtual command indicates writing.

A description of steps S701–S311 will be omitted here, because, in FIG. 13, these steps go through the same processes as in the above-described embodiments, as described with reference to FIG. 12.

Initially, in steps S701–S311, processes corresponding to the real processing command and the virtual command that have been issued are performed. Contrary to when the virtual command indicates reading, when the virtual command indicates writing, at the point of time when the seeking operation corresponding to the virtual command is completed, the disk device 13 makes a response to notify the upper control unit 9 that the seek is completed in step S703 and simultaneously requires the upper control unit 9 to send data to be written.

In step S704, the response-to-virtual-command obtaining unit 24 of the upper control unit 9 receives the response including the requirement of the data to be written, and, in step S705, the response-to-virtual-command obtaining unit 24 sends data which are inputted from the input unit 12 to the memory 10 and which are scheduled to be written in the disk type recording medium 1 to the disk device 13 by the required capacity. In step S706, the disk device 13 which receives the data stores the data in the memory 6.

The disk device 13 which has finished storing the above-described data in the memory 6 makes a-response to notify the upper control unit 9 that receiving is completed in step S707, and the response-to-virtual-command obtaining unit 24 of the upper control unit 9 receives this response in step S708. Thereafter, in step S312, the state of the disk device 13 moves to a standby state where the disk device 13 waits for a command from the upper control unit 9.

In this way, as advance operations corresponding to the virtual command, the upper control unit 9 performs a process in which the seek and movement is performed to the expected address and proceeds to a process in which data expected to be written or read by the virtual command are recorded in the memory 6 in the disk device 13. Therefore, the degree of freedom in the control of the upper control unit 9 can be increased, and further, an operation can be performed by switching to a more optimal seek speed or disk rotation speed for a desired device performance of the disk device 13 while improving the security of continuous data.

However, for example, while the recording/playback apparatus stores data to be read or data to be written in the memory 6 as described above according to the advance operation of the virtual command, it is supposed that the operator issues a command which is different from the virtual command to the upper control unit 9 of the recording/playback apparatus and that the upper control unit 9 issues a new real processing command which is different from the expected virtual command.

In this case, in order to rapidly carry out the process corresponding to the next new command, the quantity of data corresponding to the virtual command, which data are stored in the memory 6, has an influence.

Hereinafter, a case where the new command indicates reading and a case where the new command indicates writing will be described with respect to the data storage quantity in the memory 6.

Initially, when the expected virtual command indicates reading of data from the disk type recording medium 1, the new command eliminates the need for data to be stored in the memory 6 by the virtual command, whereby the data should instead be deleted. Therefore, the quantity of data to be stored beforehand in the memory 6 leaves a rapid execution of the next new command untouched even when most parts of its capacity are used.

On the other hand, when the expected virtual command indicates writing of data in the disk type recording medium 1, data stored from the memory 10 in the memory 6 by the virtual command are no longer in the memory 10. Therefore, when the data are deleted from the memory 6, the data to be written are completely lost, whereby it is supposed that there is a case where this data cannot be deleted. In this case, assuming that different data have been read from the disk type recording medium 1 and that a new command of reproducing an image has been issued, faster reading of data from the disk type recording medium 1 becomes necessary. In addition, since a capacity of the memory 6 becomes necessary for reading of data, if data written in the memory 6 by the expected virtual command are stored by employing most of the memory 6, it will cause interference with the next new command.

Therefore, in the processes corresponding to the expected virtual command, when reading data that are stored in the memory 6, an approximately whole capacity of the memory 6 is employed. When the process corresponding to the expected virtual command is writing and the data to be written are stored in the memory 6, a part of the capacity of the memory 6 is employed, and a free capacity that is required for the memory 6 is maintained so as to perform the process at high speed when the new command is issued.

Thereby, even when the advance operation is performed, which operation is that, even when the upper control unit 9 suddenly changes the command unlike with the scheduled virtual command, data to be read or data to be written are stored in the memory 6 in accordance with the scheduled virtual command, the command can thus be carried out without impairing the continuity of data.

As described above, in the recording/playback apparatus according to the fifth embodiment, as the processing operation that is performed by the disk device 13 corresponding to the virtual command, the seeking operation is performed to the expected address, and a process of recording data that are scheduled to be written or read in the memory 6 in the disk device 13 is also performed. Therefore, the device 13 carries on the above-described advance operations corresponding to the virtual command, thereby increasing the degree of the control of the upper control unit 9. Further, when the disk device 13 is made to be operated while switching to a more optimal seek speed or disk rotation speed for the device performance that is desired by the operator of the recording/playback apparatus, security of the continuous data is improved.

Further, in the fifth embodiment, considering that a new command is issued by the operator or the like, the expected virtual command is not changed to the real processing command, and therefore, the quantity used for storing data in the memory 6 is changed depending on a case where the virtual command indicates reading and a case.where it indicates writing. Therefore, even when the upper control unit 9 suddenly changes the command unlike with the scheduled command, the next new command can be carried out upon performing the advance operation of storing data to be read and data to be written in the memory 6 without impairing the continuity of data.

Sixth Embodiment

Hereinafter, a sixth embodiment of the present invention will be described.

In the sixth embodiment, a process when the disk device 13 is exchanged because of failure will be described.

A construction of the recording/playback apparatus in the sixth embodiment applies to the above-described second to fifth embodiments, and such a construction will be described with reference to FIG. 3 here.

When the disk type recording medium 1, the recording/playback head 2 or the like breaks down, the disk device 13 is sometimes exchanged. At this time, assuming that the upper control unit 9 previously has information concerning the speed of the disk device 13 and information of power consumption on a software or the memory 10, it becomes impossible to control a correct value of the disk device 13 after the disk device 13 has been exchanged.

To avoid this, for example, the disk device 13 stores the information concerning the speed of the disk device 13, the information of power consumption or the like in a predetermined format on the disk type recording medium 1 or in a nonvolatile memory (not shown) in the disk device 13, and the upper control unit 9 is allowed to obtain such information when the recording/playback apparatus starts up as required or the like. Thereby, since the disk device 13 itself stores the information even when the disk device 13 is exchanged, the upper control unit 9 can obtain the information so as to newly create an appropriate judgment criteria, thereby obtaining effects described in the above-described embodiments in the recording/playback apparatus without any problem.

A recording/playback apparatus according to the present invention is useful for satisfying a device performance that is desired by the operator of the device, without interrupting continuous data, in a magnetic disk device which is included in electronic equipment for handling continuous audio or video data.

What is claimed is:

1. A recording/playback apparatus comprising:

a disk device for recording data on a disk type recording medium; and an upper control unit for controlling processes of at least one of input/output of data from/to the outside of said apparatus, reproduction and processing of data, and data processing of at least one of reading and writing of said disk device; wherein:

said upper control unit includes a composite command issuance unit which issues, to said disk device, a composite command comprising a real processing command, which is a processing command to be actually executed in said disk device, and a virtual command, which is a processing command that is expected to be issued by said upper control unit to said disk device after said disk device has processed the real processing command; and said disk device comprises a lower control means for receiving the composite command from said upper control unit, and for controlling at least one of writing and reading of digital data, and a recording/playback head for performing at least one of writing and reading of digital data in/from the disk type recording medium, wherein said lower control means includes a virtual command reception means for notifying said upper control unit that the process corresponding to the real processing command is completed on the basis of a completion of the real processing command, for receiving the virtual command of the composite command, and for controlling said disk device to move a process corresponding to the virtual command and to then standby, and wherein the process corresponding to the virtual command is a process up to a point of time when said disk device cannot continue the operation thereof unless the virtual command is changed to the real processing command.

2. The recording/playback apparatus according to claim 1, wherein:

said upper control unit further comprises a judgment criteria issuance means for creating judgment criteria which is suitable for a performance that is desired by an operator of said recording/playback apparatus, and for issuing the judgment criteria to said disk device, the performance being at least one of uniquely set and selected from a plurality of prepared performances by the operator;

said disk device further comprises
  a speed switching means for switching at least one of at least two seek speeds, which are speeds for transferring said recording/playback head, and at least two disk rotation speeds, which are speeds for rotating the disk type recording medium, and
  a speed selection means for selecting at least one of an optimum seek speed and disk rotation speed from the judgment criteria; and said disk device receives the judgment criteria which is suitable for the performance that is desired by the operator from said judgment criteria issuance means, said speed selection means selects the optimum seek speed and disk rotation speed, and said speed switching means switches the seek speed and disk rotation speed to the selected optimum seek speed and disk rotation speed.

3. The recording/playback apparatus according to claim 2, wherein the judgment criteria are based on the assumption that the continuity of continuous data is maintained, include a predetermined time which restricts the frequency of switching of the disk rotation speed, and give priority to a highly expected speed in at least one of the at least two seek speeds and the at least two disk rotation speeds in accordance with the performance that is desired by the operator of said recording/playback apparatus.

4. The recording/playback apparatus according to claim 6, wherein said upper control unit further comprises an expected time information issuance means for issuing an expected time together with the composite command to said disk device, and the expected time is a time which is obtained by expecting a time which elapses from when said upper control unit issues the composite command by said composite command issuance unit to when the virtual command of the composite command is issued as the real processing command.

5. The recording/playback apparatus according to claim 2 wherein:

said upper control unit further comprises an expected time information issuance means for issuing an expected time and an expected command issuance interval together with the composite command to said disk device, the expected time is a time which is obtained by expecting a time which elapses from when said upper control unit issues the composite command by said composite command issuance unit to when the virtual command of the composite command is issued as the real processing command, the expected command issuance interval is an interval which is obtained by expecting a command issuance interval at which a plurality of commands are issued after the composite command is issued, when the expected command issuance interval is one in which, during a set time which is set to be sufficiently longer than the predetermined time that is included in the judgment criteria, first expected command intervals that are approximately equal intervals are continued and thereafter second expected intervals that are approximately equal intervals, which are different from the first expected command intervals, are continued, said expected time information issuance means issues the first expected interval, the second expected command interval, and an expected change time at which the command interval is expected to change from the first expected command interval to the second expected command interval, together with the composite command and the expected time, to said disk device, and when the expected command issuance interval is one in which the first expected command intervals are continued during the set time, said expected time information issuance means issues the first expected command interval, the second expected command interval having the same value as the first expected command interval, and the expected change time having the same value as the set time, together with the composite command and the expected time, to said disk device.

6. The recording/playback apparatus according to claim 5, wherein said disk device performs a process corresponding to the real processing command and a process corresponding to the virtual command while switching at least one of the seek speed and the disk rotation speed on the basis of the judgment criteria, and processing speed information of said disk device itself, the expected time, the first expected command interval, the second expected command interval and the expected change time.

7. The recording/playback apparatus according to claim 6, wherein said upper control unit calculates at least one of the expected time, the first expected command interval, the second expected command interval and the expected change time on the basis of a processing content of continuous data that are controlled by said upper control unit itself, calculates a speed at which the continuous data are processed in a memory that is connected to said upper control unit, and temporarily stores the continuous data and processing speed information of said disk device.

8. The recording/playback apparatus according to claim 1, wherein said virtual command reception means performs the process corresponding to the virtual command while switching at least one of the seek speed and the disk rotation speed, said disk device issues a response to said upper control unit at the point of time when each process is completed in the process corresponding to the virtual command, and said upper control unit includes a response-to-virtual-command obtaining means for obtaining the response.

9. The recording/playback apparatus according to claim 8, wherein, in the process corresponding to the virtual command, when the virtual command includes reading of address and data, said disk device performs reading after seeking to the address, stores the data in the memory installed in said disk device, issues a response to said upper control unit after the data is stored in the memory, and goes into a standby state.

10. The recording/playback apparatus according to claim 8, wherein, in the process corresponding to the virtual command, when the virtual command includes writing of address and data, said disk device issues a response to said upper control unit after seeking to the address, requires data to be written, stores the data to be written, which are transmitted from said upper control unit in response to the requirement, in the memory installed in said disk device, and goes into a standby state.

11. The recording/playback apparatus according to claim 9, wherein, in the process corresponding to the virtual command, when data to be written are stored in the memory installed in said disk device, an approximately entire capacity of the memory is used except for a capacity which is required for a minimum process, and when data to be written are stored in the memory, the data to be written are stored upon maintaining, as a free capacity, a minimum quantity which can be read at high speed by said disk device.

12. The recording/playback apparatus according to claim 1, wherein said disk device stores, in a predetermined format, an operation speed of the disk device itself, an operation switching speed and information concerning power consumption in at least one of the disk type recording medium and an nonvolatile memory which is installed in said disk device, said upper control unit further comprises a judgment criteria issuance means for creating judgment criteria which is suitable for a performance that is desired by an operator of said recording/playback apparatus, and for issuing the judgment criteria to said disk device, and said upper control unit obtains the information as required at a start-up of said recording/playback apparatus, and said judgment criteria issuance means creates the appropriate judgment criteria for said upper control unit to control said disk device.

13. The recording/playback apparatus according to claim 10 wherein, in the process corresponding to the virtual command, when data to be written are stored in the memory installed in said disk device, an approximately entire capacity of the memory is used except for a capacity which is required for a minimum process, and when data to be written are stored in the memory, the data to be written are stored upon maintaining, as a free capacity, a minimum quantity which can be read at high speed by said disk device.

14. The recording/playback apparatus according to claim 11, wherein the minimum process is an error correction.

15. The recording/playback apparatus according to claim 13, wherein the minimum process is an error correction.

16. A recording/playback apparatus comprising:
a disk device operable to record data on a disk type recording medium; and an upper control unit operable to control processes of at least one of input/output of data from/to the outside of said apparatus, reproduction and processing of data, and data processing of at least one of reading and writing of said disk device; wherein:

said upper control unit includes a composite command issuance unit which is operable to issue, to said disk device, a composite command comprising a real processing command, which is a processing command to be actually executed in said disk device, and a virtual command, which is a processing command that is expected to be issued by said upper control unit to said disk device after said disk device has processed the real processing command; and said disk device comprises
a lower control unit operable to receive the composite command from said upper control unit, and to control at least one of writing and reading of digital data, and a recording/playback head operable to perform at least one of writing and reading of digital data in/from the disk type recording medium, wherein said lower control unit includes a virtual command reception unit which is operable to notify said upper control unit that the process corresponding to the real processing command is completed on the basis of a completion of the real processing command, to receive the virtual command of the composite command, and to control said disk device to move a process corresponding to the virtual command and to then standby, and wherein the process corresponding to the virtual command is a process up to a point of time when said disk device cannot continue the operation thereof unless the virtual command is changed to the real processing command.

17. The recording/playback apparatus according to claim 16, wherein:

said upper control unit further comprises a judgment criteria issuance unit which is operable to create judgment criteria which is suitable for a performance that is desired by an operator of said recording/playback apparatus, and to issue the judgment criteria to said disk device, the performance being at least one of uniquely set and selected from a plurality of prepared performances by the operator;

said disk device further comprises
a speed switching unit operable to switch at least one of at least two seek speeds, which are speeds for transferring said recording/playback head, and at least two disk rotation speeds, which are speeds for rotating the disk type recording medium, and a speed selection unit operable to select at least one of an optimum seek speed and disk rotation speed from the judgment criteria; and said disk device is operable to receive the judgment criteria which is suitable for the performance that is desired by the operator from said judgment criteria issuance unit, said speed selection unit is operable to select the optimum seek speed and disk rotation speed, and said speed switching unit is operable to switch the seek speed and disk rotation speed to the selected optimum seek speed and disk rotation speed.

18. The recording/playback apparatus according to claim 17, wherein the judgment criteria are based on the assumption that the continuity of continuous data is maintained, include a predetermined time which restricts the frequency of switching of the disk rotation speed, and give priority to a highly expected speed in at least one of the at least two seek speeds and the at least two disk rotation speeds in accordance with the performance that is desired by the operator of said recording/playback apparatus.

19. The recording/playback apparatus according to claim 17, wherein
said upper control unit further comprises an expected time information issuance unit which is operable to issue an expected time together with the composite command to said disk device, and
the expected time is a time which is obtained by expecting a time which elapses from when said upper control unit issues the composite command by said composite command issuance unit to when the virtual command of the composite command is issued as the real processing command.

20. The recording/playback apparatus according to claim 17; wherein:
said upper control unit further comprises an expected time information issuance unit which is operable to issue an expected time and an expected command issuance interval together with the composite command to said disk device,
the expected time is a time which is obtained by expecting a time which elapses from when said upper control unit issues the composite command by said composite command issuance unit to when the virtual command of the composite command is issued as the real processing command,
the expected command issuance interval is an interval which is obtained by expecting a command issuance interval at which a plurality of commands are issued after the composite command is issued,
when the expected command issuance interval is one in which, during a set time which is set to be sufficiently longer than the predetermined time that is included in the judgment criteria, first expected command intervals that are approximately equal intervals are continued and thereafter second expected intervals that are approximately equal intervals, which are different from the first expected command intervals, are continued, said expected time information issuance unit is operable to issue the first expected interval, the second expected command interval, and an expected change time at which the command interval is expected to change from the first expected command interval to the second expected command interval, together with the composite command and the expected time, to said disk device, and
when the expected command issuance interval is one in which the first expected command intervals are continued during the set time, said expected time information issuance unit is operable to issue the first expected command interval, the second expected command interval having the same value as the first expected command interval, and the expected change time having the same value as the set time, together with the composite command and the expected time, to said disk device.

21. The recording/playback apparatus according to claim 20, wherein said disk device is operable to perform a process corresponding to the real processing command and a process corresponding to the virtual command while switching at least one of the seek speed and the disk rotation speed on the basis of the judgment criteria, and processing speed information of said disk device itself, the expected time, the first expected command interval, the second expected command interval and the expected change time.

22. The recording/playback apparatus according to claim 21, wherein said upper control unit is operable to calculate at least one of the expected time, the first expected command interval, the second expected command interval and the expected change time on the basis of a processing content of continuous data that are controlled by said upper control unit itself, to calculate a speed at which the continuous data are processed in a memory that is connected to said upper control unit, and to temporarily store the continuous data and processing speed information of said disk device.

23. The recording/playback apparatus according to claim 16, wherein
said virtual command reception unit is operable to perform the process corresponding to the virtual command while switching at least one of the seek speed and the disk rotation speed,
said disk device is operable to issue a response to said upper control unit at the point of time when each process is completed in the process corresponding to the virtual command, and
said upper control unit includes a response-to-virtual-command obtaining unit which is operable to obtain the response.

24. The recording/playback apparatus according to claim 23, wherein, in the process corresponding to the virtual command, when the virtual command includes reading of address and data, said disk device is operable to perform reading after seeking to the address, to store the data in the memory installed in said disk device, to issue a response to said upper control unit after the data is stored in the memory, and to then go into a standby state.

25. The recording/playback apparatus according to claim 23, wherein, in the process corresponding to the virtual command, when the virtual command includes writing of address and data, said disk device is operable to issue a response to said upper control unit after seeking to the address, to require data to be written, to store the data to be written, which are transmitted from said upper control unit in response to the requirement, in the memory installed in said disk device, and to go into a standby state.

26. The recording/playback apparatus according to claim 24, wherein, in the process corresponding to the virtual command,
when data to be written are stored in the memory installed in said disk device, an approximately entire capacity of the memory is used except for a capacity which is required for a minimum process, and
when data to be written are stored in the memory, the data to be written are stored upon maintaining, as a free capacity, a minimum quantity which can be read at high speed by said disk device.

27. The recording/playback apparatus according to claim 16, wherein
said disk device is operable to store, in a predetermined format, an operation speed of the disk device itself, an operation switching speed and information concerning power consumption in at least one of the disk type recording medium and a nonvolatile memory which is installed in said disk device,
said upper control unit further comprises a judgment criteria issuance unit which is operable to create judgment criteria which is suitable for a performance that is desired by an operator of said recording/playback apparatus, and to issue the judgment criteria to said disk device, and said upper control unit is operable to obtain the information as required at a start-up of said recording/playback apparatus, and said judgment criteria issuance unit is operable to create the appropriate judgment criteria for said upper control unit to control said disk device.

28. The recording/playback apparatus according to claim 25, wherein, in the process corresponding to the virtual command, when data to be written are stored in the memory installed in said disk device, an approximately entire capacity of the memory is used except for a capacity which is required for a minimum process, and when data to be written are stored in the memory, the data to be written are stored upon maintaining, as a free capacity, a minimum quantity which can be read at high speed by said disk device.

29. The recording/playback apparatus according to claim 26, wherein the minimum process is an error correction.

30. The recording/playback apparatus according to claim 28, wherein the minimum process is an error correction.

* * * * *